United States Patent
Cook et al.

(10) Patent No.: US 12,513,488 B2
(45) Date of Patent: Dec. 30, 2025

(54) MOBILE WIFI NETWORK

(71) Applicant: Comcast Cable Communications, LLC, Philadelphia, PA (US)

(72) Inventors: Michael J. Cook, Flemington, NJ (US); Ivan Ong, Malvern, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/393,324

(22) Filed: Apr. 24, 2019

(65) Prior Publication Data
US 2020/0092675 A1   Mar. 19, 2020

Related U.S. Application Data

(63) Continuation of application No. 15/496,503, filed on Apr. 25, 2017, now Pat. No. 10,321,268, which is a continuation of application No. 13/351,585, filed on Jan. 17, 2012, now Pat. No. 9,686,647.

(51) Int. Cl.
| | |
|---|---|
| H04W 4/02 | (2018.01) |
| H04W 16/18 | (2009.01) |
| H04W 24/02 | (2009.01) |
| H04W 84/18 | (2009.01) |

(52) U.S. Cl.
CPC .......... H04W 4/023 (2013.01); H04W 16/18 (2013.01); H04W 24/02 (2013.01); H04W 84/18 (2013.01)

(58) Field of Classification Search
CPC ..... H04W 4/023; H04W 16/18; H04W 24/02; H04W 84/18
See application file for complete search history.

(56) References Cited

U.S. PATENT DOCUMENTS

| | | | |
|---|---|---|---|
| 7,596,385 B2 | 9/2009 | Aghvami et al. | |
| 7,996,018 B1 * | 8/2011 | Fan | H04B 1/3805 455/414.3 |
| 8,064,925 B1 * | 11/2011 | Sun | H04W 64/006 455/456.1 |
| 8,085,792 B1 * | 12/2011 | Aly | H04W 40/28 370/310 |
| 9,036,509 B1 * | 5/2015 | Addepalli | H04W 72/20 701/1 |
| 9,131,529 B1 * | 9/2015 | Ayyagari | H04W 84/20 |
| 2005/0063318 A1 | 3/2005 | Xu et al. | |
| 2005/0076137 A1 | 4/2005 | Tang et al. | |
| 2005/0261004 A1 | 11/2005 | Dietrich et al. | |

(Continued)

FOREIGN PATENT DOCUMENTS

| | | | |
|---|---|---|---|
| EP | 1560451 A2 | | 8/2005 |
| WO | 2008075347 A2 | | 6/2008 |
| WO | WO 2008/075347 | * | 6/2008 |

OTHER PUBLICATIONS

Google Scholar Search results.*

(Continued)

*Primary Examiner* — Qun Shen
(74) *Attorney, Agent, or Firm* — Banner & Witcoff, Ltd.

(57) ABSTRACT

Methods, apparatuses, computer-readable media, and systems are provided for managing a dynamic wireless network. Access points may be mobile and may be caused to move to locations to improve wireless coverage and network access for user devices.

36 Claims, 12 Drawing Sheets

(56) References Cited

U.S. PATENT DOCUMENTS

| | | | |
|---|---|---|---|
| 2006/0285523 A1* | 12/2006 | Ishii | H04W 16/10 370/335 |
| 2007/0015495 A1 | 1/2007 | Winter et al. | |
| 2007/0287473 A1* | 12/2007 | Dupray | H04W 4/029 455/456.1 |
| 2008/0253386 A1 | 10/2008 | Barum | |
| 2008/0270163 A1* | 10/2008 | Green | G06Q 30/02 705/14.4 |
| 2008/0280564 A1 | 11/2008 | Hoekstra et al. | |
| 2009/0257373 A1* | 10/2009 | Bejerano | H04W 24/04 370/328 |
| 2009/0303034 A1* | 12/2009 | Abedi | G06Q 10/04 340/539.1 |
| 2010/0216461 A1 | 8/2010 | Kalhan | |
| 2010/0272059 A1* | 10/2010 | Bienas | H04W 36/385 455/450 |
| 2011/0004406 A1* | 1/2011 | Davis | B60L 53/18 701/300 |
| 2011/0009098 A1 | 1/2011 | Kong | |
| 2011/0195707 A1* | 8/2011 | Faerber | H04W 24/08 455/423 |
| 2011/0307599 A1 | 12/2011 | Saretto et al. | |
| 2011/0320819 A1 | 12/2011 | Weber et al. | |
| 2013/0064089 A1 | 3/2013 | Wu et al. | |
| 2013/0072146 A1 | 3/2013 | Smith | |
| 2013/0109409 A1* | 5/2013 | Ortiz | H04W 4/02 455/456.3 |
| 2014/0282868 A1* | 9/2014 | Sheller | G06F 21/31 726/3 |

OTHER PUBLICATIONS

Partial European Search Report—EP 13151390.5—Mailing Date: May 10, 2013.
Extended European Search Report—EP 13151390.5—Mailign Date: Aug. 27, 2013.
Jul. 28, 2017—European Office Action—13151390.5.
Nov. 29, 2018—European Office Action—EP 13151390.5.
Jun. 20, 2019—Canadian Office Action—CA 2,802,400.
Jul. 5, 2019—European Office Action—EP 13151390.5.
Jun. 10, 2020—Canadian Office Action—CA 2,802,400.
Jun. 30, 2020—European Extended Search Report—EP 20171344.3.
Sep. 17, 2021—Canadian Office Action—CA 2,802,400.
Jun. 10, 2022—CA Office Action6—CA App. No. 2,802,400.
May 18, 2022—European Office Action—EP 20171344.3.

* cited by examiner

| Transceivers | Transceiver ID | Location | Previous Location | Available | Unavailable | Temporarily Unavailable | Overutilized | Underutilized |
|---|---|---|---|---|---|---|---|---|
| 1 | 000001 | X1,Y1,Z1 | X1',Y1',Z1' | X | | | X | |
| 2 | 000010 | X2,Y2,Z2 | X2',Y2',Z2' | | | X | | X |
| 3 | 000011 | X3,Y3,Z3 | X3',Y3',Z3' | | X | | X | |
| 4 | 000100 | X4,Y4,Z4 | X4',Y4',Z4' | X | | | | X |
| 5 | 000101 | X5,Y5,Z5 | X5',Y5',Z5' | X | | | | X |
| ... | ... | ... | ... | ... | ... | ... | ... | ... |
| N | 111111 | XN,YN,ZN | XN',YN',ZN' | | X | | | X |

MOBILE WIFI NETWORK

CROSS-REFERENCE TO RELATED APPLICATIONS

This application is a continuation of and claims priority to U.S. patent application Ser. No. 15/496,503, which was filed on Apr. 25, 2017 and entitled "MOBILE WiFi NETWORK, and which is a continuation of and claims priority to U.S. patent application Ser. No. 13/351,585, which was filed on Jan. 17, 2012 and entitled "MOBILE WiFi NETWORK." Each of the above referenced applications is hereby incorporated by reference herein in its entirety.

FIELD OF ART

Features described herein generally relate to providing a WiFi network and managing the same.

BACKGROUND

Demand for access to networks such as the Internet is continuing to increase. Advancements in technology have yielded a number of electronic devices capable of connecting to networks. In particular, more and more portable devices capable of connecting to the Internet have been developed and are continuing to be developed. Accordingly, there is a need for providing network access so that electronic devices, especially portable electronic devices, can be fully appreciated.

Reaching the network typically requires a data connection to a server that is on the network; be it via fiber optic cable, coaxial cable, wireless, satellite, cellular, or other communication means. In some premises, such as homes, local wireless access nodes (e.g., wireless "hotspots") can be installed to help extend the reach of the network to spaces such as bedrooms, basements, etc. that are not within easy reach of the home's wiring outlets. Thus, users can move freely through their homes without losing their connection to the network. However, local wireless access nodes have a limited range. While the range may be sufficient to provide a connection to the network throughout a home or other premises, a user may lose their connection once they leave the home or premises.

There is a need for an improvement in expanding network access to more and more locations. Also, as the number of users of a network grows, the ability to efficiently manage their connections becomes increasingly desirable.

SUMMARY

This summary is not intended to identify critical or essential features of the inventions claimed herein, but instead merely summarizes some features and variations thereof.

In some embodiments, a dynamic mesh management platform may be used to manage mobile "hotspots". The hotspots may be provided by transceivers that are placed in mobile units, such as cars, individual persons, trucks, bicycles, boats, etc. Such mobile units may be dedicated to moving the transceivers, or may be used for other purposes and simply carry the transceivers with them. The transceivers may communicate with the dynamic mesh management platform through a cellular backhaul, for example.

The dynamic mesh management platform may receive location and other information from each of the transceivers to acquire an overall coverage area of the dynamic mesh. Using the location information the dynamic mesh management platform may provide instructions to the transceivers to improve quality of service, manage and/or adjust coverage area, and/or manage efficiency of the dynamic mesh. For example, the dynamic mesh management platform may send instructions directing the transceivers (e.g., via their associated mobile units) to various locations. In another example, the dynamic mesh management platform may instruct transceivers to turn off, forward data to another transceiver, share a data load, and more.

In accordance with one illustrative embodiment, the disclosure herein relates to a method including receiving an input, including location information, from a first transceiver among a plurality of transceivers, comparing the location information of the first transceiver with location information of one or more other transceivers among the plurality of transceivers, and determining whether the first transceiver overlaps with any of the one or more other transceivers based on a result of the comparison.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 8 illustrates a high-level diagram of data that may be generated, updated, and/or stored within a dynamic mesh management platform.

DETAILED DESCRIPTION

Figure 1:
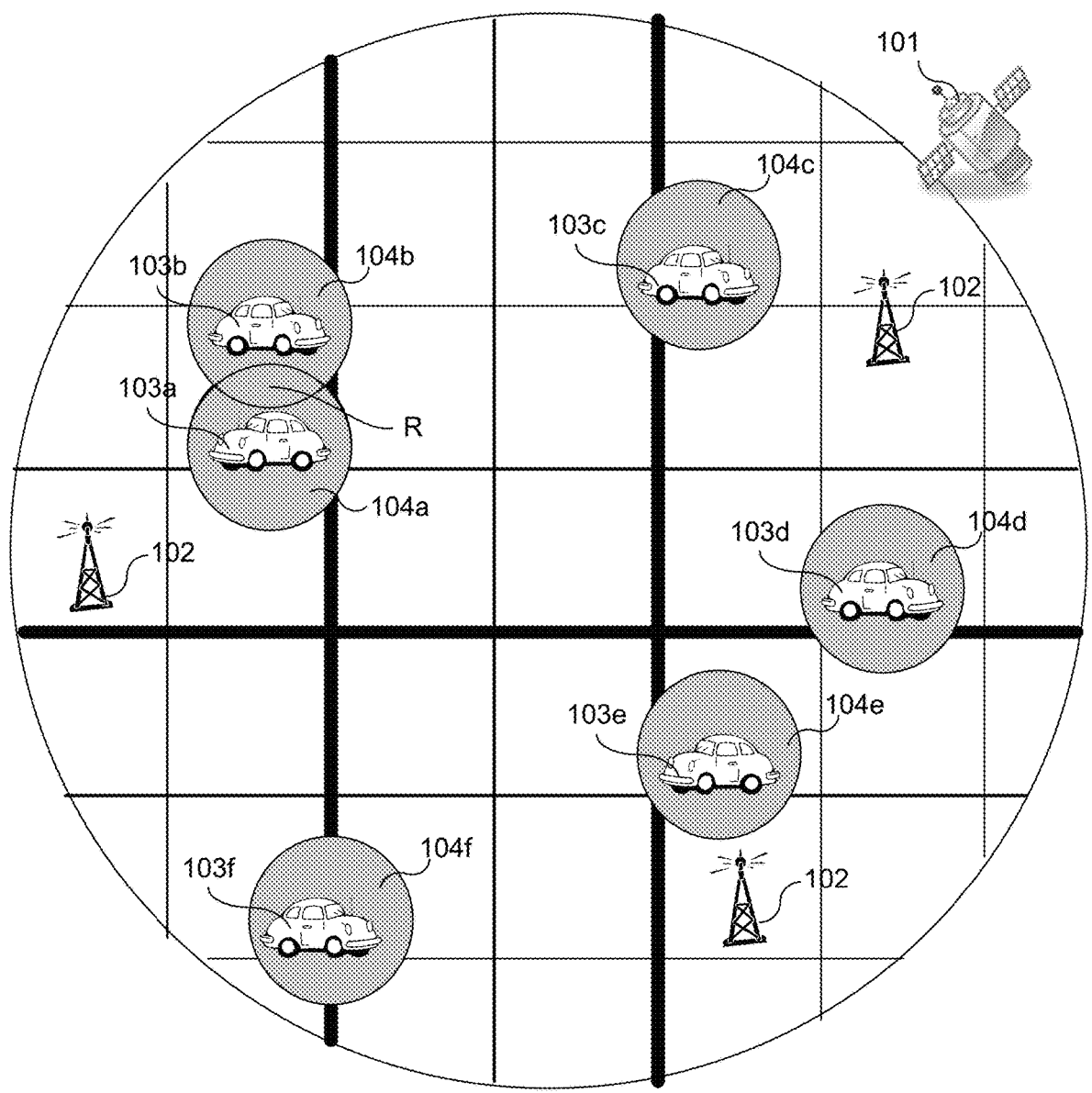
FIG. 1 illustrates an exemplary implementation of a system in accordance with some aspects of the present disclosure.

FIG. 1 illustrates an example implementation of a system or network in accordance with an aspect of the present disclosure. FIG. 1 provides a partial view of an area, such as a portion of a town or a city in which the system may be implemented. The system may be implemented in one or more of a variety of geographical areas, such as a city, town, state, community, a large premises, etc. Here, the system may include one or more satellites, such as GPS satellites 101, one or more cell towers 102, and a plurality of transceivers. As shown in FIG. 1, the transceivers may be placed in mobile units 103a-103f, such as cars. Although FIG. 1 shows mobile units 103a-103f as cars, it is contemplated that the transceivers may be placed in or on, or associated with, any other mobile unit, such as trucks, bicycles, buses, boats, humans, aerial vehicles, etc. Additionally, not all transceivers in the system must be placed in or on a mobile unit. Advantages of the system disclosed herein may be realized even when only one transceiver is placed in or on a mobile unit, while others may remain stationary.

Each of the transceivers may serve as a wireless access point, and therefore, may provide a coverage area (e.g., a "hotspot") in which users such as customers may connect to a network, such as the Internet. FIG. 1 shows coverage areas 104a-104f provided by the transceivers in the mobile units 103a-103f, respectively. Although the coverage areas 104a-104f are each shown as covering a circular area around the respective mobile units 103a-103f, it should be understood that such areas do not have to be circular. Also, the coverage areas 104a-104f do not have to cover the same size areas. Rather, the coverage areas 104a-104f may have different sizes and shapes depending, in part, on the characteristics of the transceivers that create them.

As is evident from FIG. 1, the area that is covered depends, in part, on the location and amount of transceivers. If a large number of transceivers could be spread out across the area, the network of transceivers could provide coverage spanning the entire area. But, because the transceivers are located in mobile units 103a-103f, the overall coverage area of the system may undergo many changes. One situation that may occur as a result of placing the transceivers in mobile units is that two or more transceivers may be within range of each other. For example, as shown in FIG. 1, a mobile unit 103a may be near mobile unit 103b. In this case, the coverage area 104a provided by the transceiver in mobile unit 103a may overlap with the coverage area 104b provided by the transceiver in mobile unit 103b to form an overlap region R. When an overlap region R forms, the overall efficiency of the system may be reduced. The system disclosed herein may be configured to address such and other inefficiencies.

Figure 2:
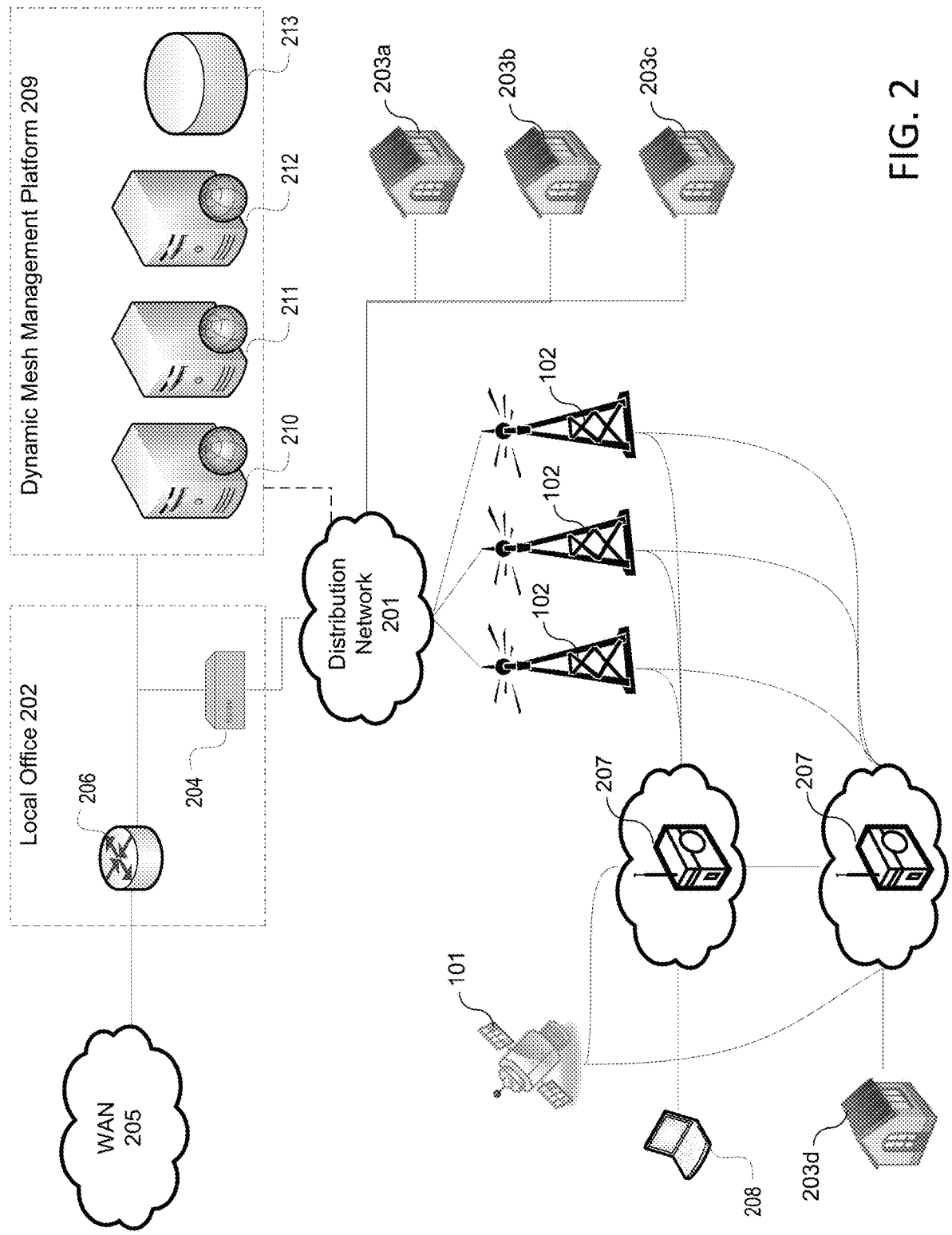
FIG. 2 illustrates an example system in which some of the various features described herein may be implemented.

FIG. 2 illustrates an example system in which various features described herein may be implemented. The system may include, for example, one or more information distribution or access networks 201. The distribution network 201 may be any type of data or content distribution network, employing any type or combination of communication links. For example, the distribution network 201 may be a wireless, fiber optic, coaxial cable and/or hybrid fiber/coax (HFC) network of cables, wires, and wireless communication links, connecting a local office 202 (e.g., a headend) to one or more premises 203a-203c (e.g., homes) and/or the one or more cell towers 102. Elements 203a-203c may also represent neighborhoods, city blocks, streets, zones, business establishments, etc. At each of the premises 203a-203c, there may be a network access device (e.g., coaxial cable modem, fiber termination node, wireless node, telephone network interface unit, etc.), which may communicate over the distribution network 201 with a network interface device 204 at the local office 202. The network interface device 204 may be, for example, a termination server (e.g., a Data Over Cable Service Interface Specification Cable Modem Termination Server—DOCSIS CMTS in an HFC type network), a broadband remote access server (BRAS), a gateway GPRS support node (GGSN), or a combination thereof.

The various premises 203a-203c and cell towers 102 may use their connection to the distribution network 201 to access each other, the local office 202, and any other computing devices over any other wide area network (WAN) 205. The WAN 205 may be, for example, any network supporting Internet Protocol devices, a telephone network, satellite network, fiber optic network, a local WiFi network (e.g., WiMAX), cellular telephone, etc., and may use a router, such as a gateway access router 206. The router 206 can be, for example, any gateway computing device with an interface to the WAN 205 (e.g., an Internet gateway). The WAN 205 can also include local connection types, such as Ethernet, Firewire, etc.

Users at premises 203a-203c may happily use their premises' network connections to access the distribution network 201 and WAN 205, but other users might be at a location where they do not have access to the distribution network 201 and WAN 205. For example, a user may be at a premise 203d, which does not have access to the distribution network 201 or WAN 205. Further, users of mobile client devices, such as laptops, tablets, notebooks, smartphones, etc., might not have access to the distribution network 201 and WAN 205 outside their homes or places of business. To extend the reach of the distribution network 201 and WAN 205 to these users and others, the system may include one or more cell towers 102 and one or more transceivers 207.

The cell towers 102 may each have a network access interface similar to those at premises 203a-203c (e.g., a modem, network interface unit, etc.) to connect to the distribution network 201 and WAN 205. Additionally, the cell towers 102 may have wireless circuitry to wirelessly communicate with other devices, such as transceivers 207. That is, the cell towers 102 may communicate with the transceivers 207 via a cellular backhaul. The transceivers 207 may be equipped with cellular communication circuitry to transmit signals to the cell towers 102 over frequencies within the electromagnetic spectrum. Such cellular communication circuitry may be similar to that of mobile devices that connect to cell towers, and which is known to those of ordinary skill in the art. For example, such cellular communication circuitry may include 3G and 4G compatible circuitry. Using the above described cellular communication circuitry, the transceivers 207 may transmit/receive cellular signals to/from cell towers 102 in order to ultimately access the distribution network 201 and WAN 205 through the network access interfaces of the cell towers 102. In FIG. 2, lines connecting the transceivers 207 to the cell towers 102 represent channels through which cellular signals are transferred.

The transceivers 207 may also contain wireless circuitry, and therefore, may serve as wireless access points (WAPs). This feature is represented by the cloud surrounding each of the transceivers 207 in FIG. 2. The wireless circuitry can include any desired wireless type, such as IEEE 802.11 or 802.16 compliant circuitry, and can be configured to use any desired portion of the electromagnetic spectrum (e.g., licensed and/or unlicensed portions of the spectrum) to allow wireless access to the distribution network 201 and WAN 205 by client devices 208. That is, a client device 208 may connect to the distribution network 201 and WAN 205 through a transceiver 207 and cell tower 102. Thus, a client device 208 may access the distribution network 201 and WAN 205 from various locations, including from within a premise 203d where access to the distribution network 201 and WAN 205 otherwise is not available.

The transceivers 207 may include various types of wireless circuitry to connect to various types of client devices 208. Examples of the different client devices 208 that may connect to the transceivers are laptops, smartphones, PDAs, tablets, etc. Although FIG. 2 shows just one client device 208, a plurality of client devices may be connected to each of the transceivers 207. Also, each client device 208 may connect to any of the transceivers 207 that they are within range of. In other words, where the coverage areas of two different transceivers 207 overlap and a client device 208 is within the overlap region R, the client device 208 may connect to either one of the two transceivers 207. The client device 208 may choose which of the transceivers 207 to connect to based on results of clear channel assessments and received signal strength indicator (RSSI) levels.

The transceivers 207 may form a wireless mesh network, enabling, for example, interconnection of devices and/or consolidating wireless access to the distribution network 201. Further, the transceivers 207 may form a plurality of wireless access points that may have common characteristics (e.g., SSIDs, profile configurations, etc.) to simplify their use. The transceivers 207 within the mesh may communicate with one another so that, for example, if the link between one transceiver 207 and a cell tower 102 becomes unusable due to interference, lack of bandwidth, or the like, that transceiver 207 can transmit its data to another transceiver 207 which may forward it on to a cell tower 102. In some embodiments, these transceivers 207 and cell towers 102 may support multiple wireless mesh networks, each having different protocols and/or identifiers (e.g., SSIDs).

Additionally, the transceivers 207 may include satellite communication circuitry. Using such circuitry, each of the transceivers 207 may communicate directly with one or more satellites 101 or with other electronic devices, such as a mobile unit's GPS or the GPS on a client device 208, to obtain the location of the transceiver 207. For example, the transceivers 207 may obtain their GPS coordinates from a satellite 101. Although FIG. 2 shows just one satellite 101, a plurality of satellites 101 may communicate with the transceivers 207. In FIG. 2, lines connecting the transceivers 207 to the satellite 101 represent channels through which satellite signals are transferred.

To coordinate, deploy, and manage the transceivers 207, the system may include a dynamic mesh management platform 209 that generally manages the various wireless networks provided by the transceivers 207. The dynamic mesh management platform 209, which may comprise any computing device adapted to manage network components, may be co-located with the local office 202, or it may be wired or wirelessly connected via a local or wide area network. The dynamic mesh management platform 209 itself may include one or more computer servers, configured to perform the various functions described herein. One server may be a provisioning server 210. The provisioning server 210 may be responsible for managing the allocation of Internet Protocol (IP) addresses to wireless devices coming on the distribution network 201, and for managing the distribution network 201 in general (as will be described below). The dynamic mesh management platform 209 may also include one or more tunneling servers 211. The tunneling servers 211 may be configured to terminate and administer secure communication tunnels or links with various devices, including client devices 208, on the distribution network 201. For example, the tunneling server 211 (e.g., a Layer 2 Tunneling Protocol (L2TP) termination server, a generic routing encapsulation (GRE) server, a Layer 2 VPN over GRE (L2VPNoGRE) server, etc.) may be configured to establish a secure tunnel with one or more of the transceivers 207. Any desired type of secure communication server capable of providing a secure link (IPsec, VPN, etc.) can be used.

The dynamic mesh management platform 209 may also include other servers 212, which can be configured to assist with DHCP IP address assignments, domain name lookup operations, etc. The various servers are illustrated separately for convenience, but in practice they may be combined/subdivided in any desired manner. The description herein may generally attribute the various server functions to the dynamic mesh management platform 209 as a whole, but the ultimate responsibilities may be divided and shared among the plurality of servers 210, 211, and 212. Additionally, the dynamic mesh management platform 209 may have a storage unit or database 213, including RAM, ROM, flash memory, etc., to store desired information received from the transceivers 207 and/or client devices 208. For example, the storage unit 213 may store location information of the transceivers 207.

Figure 3:
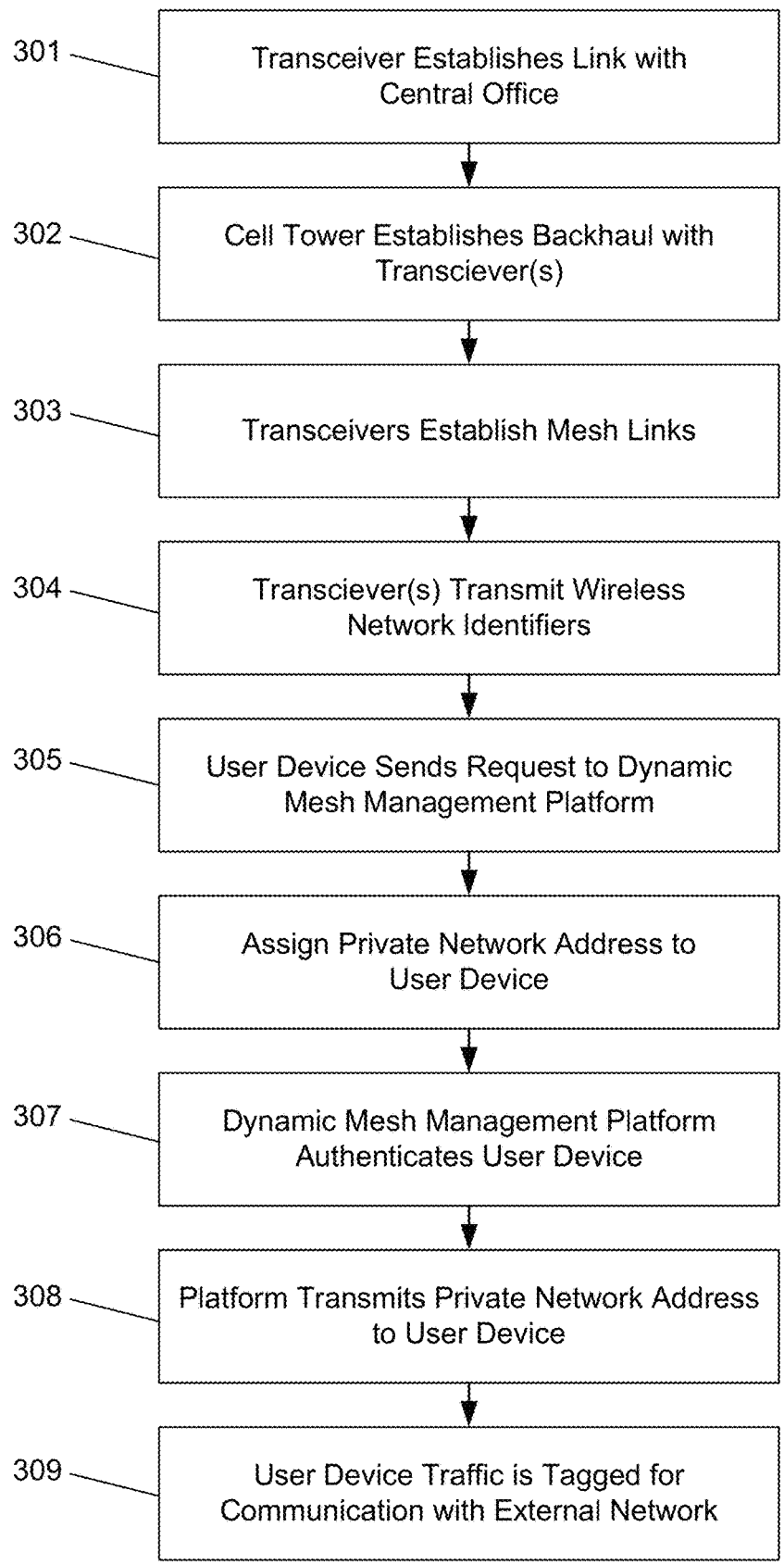
FIG. 3 illustrates an example process for incorporating a transceiver into a mobile WiFi network.

FIG. 3 illustrates an example method that can be implemented on the network shown in FIG. 2. Similar methods may be implemented on other networks. The method involves incorporating a transceiver 207, which functions as a mobile wireless access point, among other functions, into a wireless network, such as a mobile WiFi network. The example process in FIG. 3 begins with a cell tower 102, or similar device in a wireless network, coming online in step 301. As noted above, the cell tower 102 may have a direct connection to the distribution network 201, such as through a modem or other network interface device (e.g., DOCSIS, fiber, Ethernet, etc.), and may also have wireless circuitry. When the cell tower 102 comes online (e.g., initially connected, powered on, etc.), it can establish a communication link with the distribution network 102, such as, in an example of an HFC-type network, by establishing a DOCSIS connection via a network interface device 204, such as a termination system (e.g., CMTS). First-time modems may undergo a more detailed provisioning process with the CMTS, which may include providing modem identification information (e.g., a media access control—MAC—address), and user authentication.

As part of coming online, the cell tower 102 or a network access interface of the cell tower 102 may be assigned an Internet Protocol address by the provisioning server 210 (which may use a DHCP server as well for this). The cell tower 102's IP address may be a private address managed by the wireless provisioning server 210. For example, the provisioning server 210 may, through the gateway access router 206, have a single public IP address that is registered with domain name servers out on the WAN 205 (e.g., the Internet), and it can manage (or create) a listing of private IP addresses. The private IP addresses might not be registered on servers out on the WAN 205, but rather may be addresses that are assigned by the provisioning server 210 for use within the distribution network 201 managed by the dynamic mesh management platform 209. In some embodiments, the gateway access router 206 may include a network address translation table and may translate the private IP addresses using a public IP address pool.

The cell tower 102 or network access interface of the cell tower 102 may also establish a secure tunnel for communications with the tunneling server 211. As noted above, this may be any desired type of secure communications link, such as a Layer 2 Tunneling Protocol (L2TP) tunnel, a GRE tunnel, etc. With the tunnel in place, the cell tower 102 may securely communicate with the tunneling server 211, and the other devices of the dynamic mesh management platform 209.

Once the cell tower 102 is up and running on the distribution network 201, the cell tower 102 may then establish a cellular backhaul link with one or more transceivers 207 (e.g., form the lines in FIG. 2 connecting cell towers 102 with transceivers 207) in step 302. This link may be made using licensed cellular frequencies of the electromagnetic spectrum. The transceivers 207 may use this cellular backhaul to communicate with the cell towers 102 and ultimately access the distribution network 201 and WAN 205. In some embodiments, the cellular backhaul may also include telephone wires, fiber optic cable, coaxial cable, satellite channels, hybrid fiber-coaxial (HFC) connections, Ethernet connections, passive optical network (PON) connections, etc.

In step 303, the various transceivers 207 may establish wireless mesh links with one another (e.g., establish communication lines in FIG. 2 connecting transceivers 207 to each other). The mesh links may utilize wireless type circuitry, such as IEEE 802.11 or 802.16 compliant circuitry. The mesh network permits rerouting of signaling in case any particular cellular channel becomes unusable, inefficient, or costly (e.g., due to interference, congestion, etc.). For example, if the wireless link between a first transceiver 207 and a cell tower 102 is unusable due to interference, the first transceiver 207 may use a second transceiver 207 to connect through the cellular backhaul to the distribution network 201 and WAN 205.

In step 304, once the mesh network is up and running, the various transceivers 207 may transmit, e.g., broadcast or unicast, their wireless network identifiers (e.g., wireless SSIDs), and may begin receiving connection requests from various user or client devices 208, such as portable laptops, computers, display devices, mobile phones, personal data assistants, etc. In some embodiments, the transceivers 207 may broadcast different network identifiers to support multiple different types of wireless networks. For example, a transceiver 207 may broadcast one identifier (e.g., "Wireless_1") intended for use by customers of one service, and another identifier (e.g., "Wireless_2") intended for use by customers of another service, and may support the two different types of wireless networks concurrently. Different client devices 208 may log in to different wireless networks, depending on their own configuration and service subscription level. Further, the different networks may be provided by different entities (e.g., different system operators).

In step 305, when a user or client device 208 connects to a transceiver 207, then the transceiver 207 may use the cellular backhaul to transmit a connection request and other data to the cell tower 102, which then transmits the information to the dynamic mesh management platform 209. For example, the transceiver 207 and cell tower 102 place requests onto the upstream transmission portion of the distribution network 201 (e.g., in a secure tunnel that was established between the transceivers 207 and the dynamic mesh management platform 209).

When sending the request to the wireless management platform 209, the transceiver 207 may add a network identifier to the request, so that the request identifies the particular transceiver 207. For example, the transceiver 207 may include a network identifier (e.g., a bit value of "0101") to identify itself among the plurality of transceivers 207. The request may also include information identifying a connected client device(s) (e.g., a media access control unique address, serial number, model number, etc.), a client device user(s) (e.g., a name, account number, etc.), other transceivers 207 connected to the transceiver 207 sending the request, congestion of channels used by the transceiver 207 sending the request, signal-to-noise ratio of channels used by the transceiver, and/or the location of the transceiver 207 sending the request.

In step 306, the dynamic mesh management platform 209 may assign a private network address (e.g., private IP address) to the requesting client device 208. Further, the assignment may be recorded in a network address translation table. After assigning the private network address, the gateway access router 206 may forward the request to the dynamic mesh management platform 209.

In step 307, the dynamic mesh management platform 209 may receive the request, decrypt/decode the data according to the appropriate tunneling protocol, and then authenticate the requesting client device 208. The authentication may involve, for example, comparing the information identifying the client device 208 or the transceiver 207. For example, the dynamic mesh management platform 209 may store a list of approved client devices 208 or transceivers 207.

If the authentication fails, then the process may simply terminate with respect to that requesting client device 208. However, if the authentication passes, then, in step 308, the dynamic mesh management platform 209 may transmit the assigned private address to the cell tower 102, which transmits it through the cellular backhaul to the appropriate transceiver 207, which transmits it to the particular client device 208. The private address may be an address that is uniquely assigned to a single client device 208 connected to the distribution network 201. This unique address need not be globally unique on the WAN 205, and may simply be unique within the distribution network 201 managed by the dynamic mesh management platform 209. In contrast, a public address would be one that is uniquely assigned to a device on the WAN 205, such that messages addressed using the public address on the WAN 205 would be routable to a specific client device 208. So, for example, a packet sent to a WAN 205 server containing a public address destination would be routable to the eventual destination because the routers on the WAN 205 would know which device has that public address, but a packet containing a private address would not, because the routers on the WAN 205 (e.g., the Internet) do not associate the private address with any specific device.

Once a private network address is received, the client device 208 may use its private network address to communicate with the Internet via the transceivers 207, the cell towers 102, and the distribution network 201. Outgoing packets from the client device 208 can include the private network address as a sender address, and can be sent up over the cellular backhaul and through the tunnel to the dynamic mesh management platform 209. In step 309, an address translation server (e.g., within DHCP server 212) of the dynamic mesh management platform 209 may repackage the outgoing packet with a different sender address, and may add payload information identifying the actual client device 208 that sent the packet. The different sender address used for this purpose can be a public network address that is routable on the WAN 205. That public network address can be, for example, an address assigned to a server within the dynamic mesh management platform 209 that manages communications with client devices 208 connected to the transceivers 207.

Incoming packets from the WAN 205 (e.g., the Internet) may arrive at a server within the dynamic mesh management platform 209 using the server's public address, and the server may convert the public address into a private one based on additional identifying information contained in the incoming packet. The server can then prepare a new incoming packet, addressed to the client device 208 or to the transceiver 207 by its private network, and then transmit it downstream through the cellular backhaul to the transceiver 207 and client device 208.

The process in FIG. 3 may have other steps and steps may be repeated as desired, e.g., for the addition of new cell towers 102, transceivers 207, and/or user devices 208. The process may continue with the termination or signing off of certain client devices 208 or transceivers 207.

Figure 4:
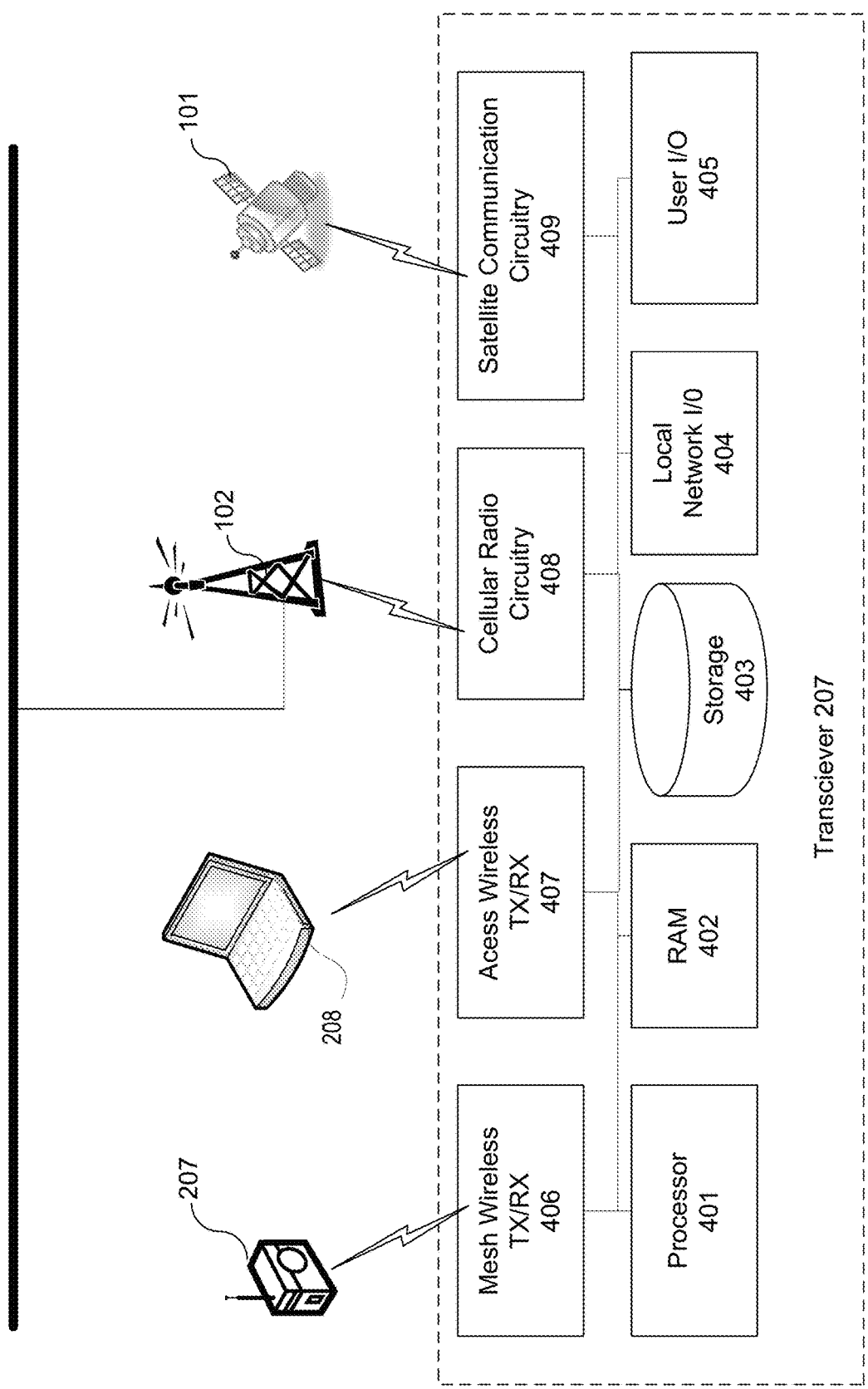
FIG. 4 illustrates components of an example transceiver.

FIG. 4 illustrates internal components of an example transceiver 207. The transceiver 207 may include, at its core, one or more processors 401. The processors 401 may execute instructions, stored in a computer-readable medium such as RAM 402 and storage 403, to cause the transceiver 207 to perform any of the steps and features described herein. The RAM 402 and storage 403 may be implemented using any desired type of computer-readable medium. For example, they can be flash, hard disks, floppy disks, optical compact disks, etc.

The transceiver 207 may also include one or more local network input/output interfaces 404, to allow the transceiver 207 to connect to any additional desired type of communication network. For example, the transceiver 207 may include an Ethernet interface, a fire-wire (IEEE 1394) interface, Bluetooth, local wireless, etc. Further, the transceiver 207 may also include one or more user input/output interface components 405. The user I/O interface components 405 may be any desired type to allow interaction with users. For example, keyboards, mice, touch screens, microphones, speakers, etc. can be included.

Additionally, the transceiver 207 may also include mesh wireless transmission/reception radio circuitry 406. The mesh radio circuitry may be any desired type, such as IEEE 802.11 or 802.16, using licensed or unlicensed portions of the electromagnetic spectrum. As discussed above, the mesh radio circuitry may be used to form a link between other transceivers 207. The transceiver 207 may also include access radio circuitry 407. The access radio circuitry 407 may use similar wireless protocols as the mesh radio circuitry 406, or it may be different, and it may be used to connect with various client devices 208 within range of the transceiver 207. Furthermore, the transceiver 207 may include cellular radio circuitry 408. The cellular radio circuitry 408 allows the transceiver 207 to transmit/receive cellular signals with the cell towers 102 in order to establish a cellular backhaul through which the client devices 208 may access the distribution network 201. The cellular radio circuitry 408 may include, for example, 3G and/or 4G compatible radio circuitry. In addition, the transceiver 207 may also include satellite communication circuitry 409, such as a global positioning system (GPS) device. Using the satellite communication circuitry 409, the transceiver 207 may transfer/receive signals to/from the satellites 101. In this manner, the transceiver 207 may obtain location information indicating its position. For example, the satellite communication circuitry 409 may obtain the latitude and longitude of the transceiver 207.

Also, although not shown, the transceiver 207 may be equipped with a battery or other power supply. Alternatively, the transceiver 207 may receive power from an external power supply. For example, where the transceiver 207 is installed in a vehicle, the transceiver 207 may receive its power from the vehicle's battery.

Although the example components in FIG. 4 are illustrated as separate components, they may be combined/divided to form different components. For example, the separate components may have their own processors, memories, and network interfaces, with the processors executing instructions stored on the memories to result in the performance of any of the steps and features described herein.

Figure 5A:
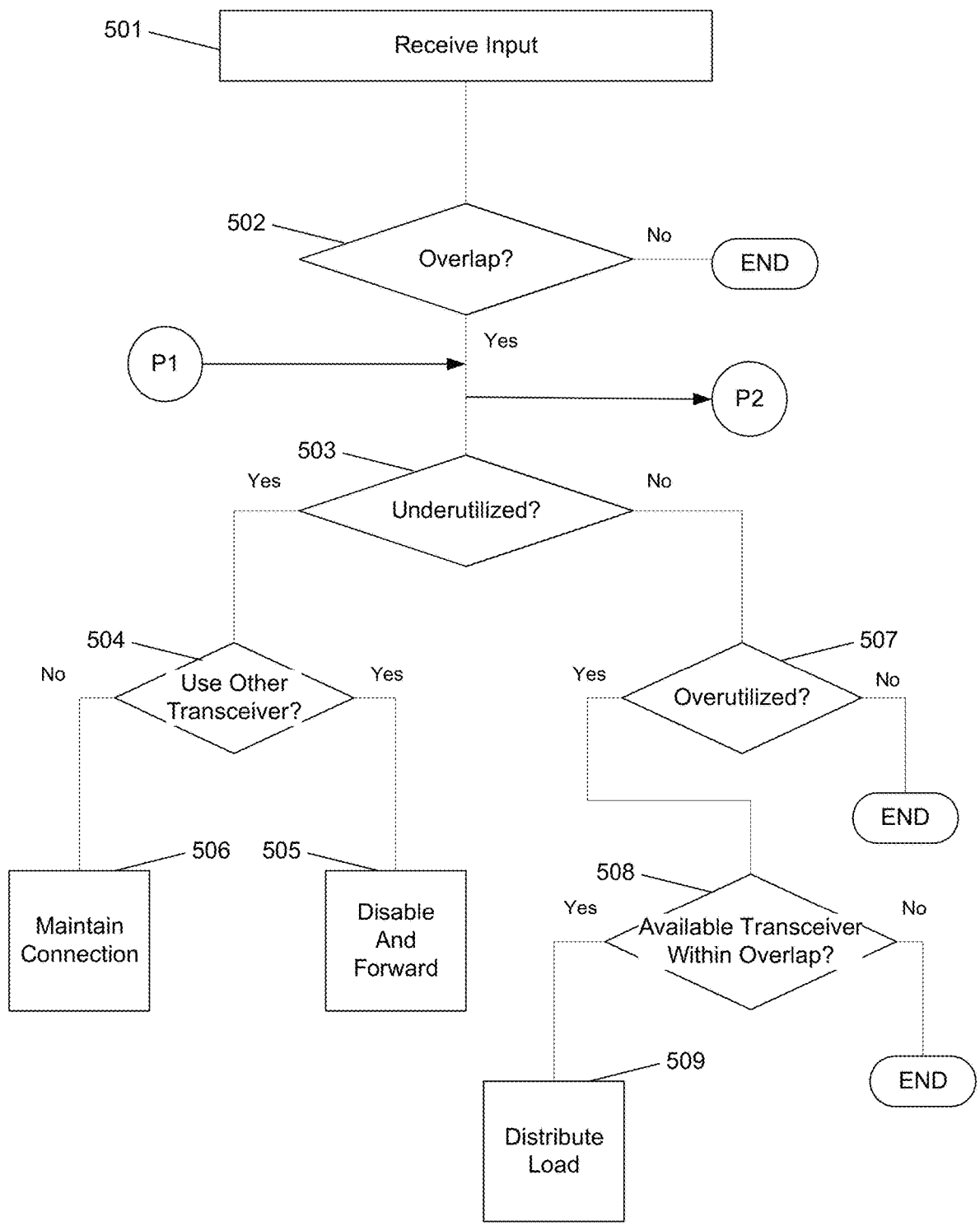
FIGS. 5A and 5B illustrate example processes for managing a dynamic mesh.

FIG. 5A illustrates an example process for managing a dynamic mesh network. While FIG. 5A illustrates just one example of the process for managing a dynamic mesh, it should be understood that other methods may be performed to manage the dynamic mesh. Here, the example process in FIG. 5A begins with step 501 in which an input is received from a transceiver 207 (below the transceiver 207 that sent the input is referred to as the "transmitting transceiver") via the cellular backhaul. For example, the input received may be a request for access to the distribution network 201 or another network, such as the WAN 205, an update notice for indicating a status of the transmitting transceiver 207, which may be generated at a predetermined interval (e.g., every 5 seconds), or a request for content, such as a webpage, on the distribution network 201 or on another network, such as the WAN 205 (e.g., the Internet). Further, the input may include location information and/or status information of the transmitting transceiver 207 from which the input is received. The location information may be any information indicating the location/position of the transmitting transceiver 207. The status information may include a number of client devices 208 connected to the transmitting transceiver 207, a number of other transceivers 207 within range of the transmitting transceiver 207, a number of cell towers 102 within range of the transmitting transceiver 207, a signal-to-noise (S/N) ratio of channels of the transmitting transceiver 207, a strength of a signal received by the transmitting transceiver 207 (e.g., RSSI), clear channel assessment information, and/or congestion information.

In step 502, it is determined whether the location of the transmitting transceiver 207 overlaps with another transceiver 207. In this manner, an overlap region R, as shown in FIG. 1, may be identified. One way to determine whether the transmitting transceiver 207 overlaps with another transceiver 207 is to detect the location information of the transmitting transceiver 207 and compare the detected location information with a listing of previously detected location information for one or more, and preferably all, of the transceivers 207. Accordingly, a storage medium, including the location information for the transceivers 207, may be searched, and the search results may return the identities of transceivers with the same or nearby locations or an indication of whether an overlap exists or not. For example, the input may be decoded to detect the GPS coordinates of the transmitting transceiver 207 and these coordinates may be compared with a listing of the GPS coordinates of all of the transceivers 207 to determine if there is an overlap. If a comparison of the location information indicates that another transceiver 207 is in the same location or a nearby location, then it may be determined that there is an overlap. Whether a transceiver 207 is deemed to be nearby another transceiver may be decided based upon a predetermined threshold. For example, a predetermined threshold of 100 meters may be set so that only if the transmitting transceiver 207 is within 100 meters of another transceiver 207 is it considered to be overlapping with the other transceiver 207.

Alternatively, determining whether there is an overlap in step 502 may be performed by decoding the input to detect whether other transceivers 207 are within range of the transmitting transceiver 207. As mentioned above, the input may contain information indicating whether other transceivers 207 are within range of the transmitting transceiver 207. If this information indicates that another transceiver 207 is in range of the transmitting transceiver 207, then it may be concluded that there is an overlap. Furthermore, in this case, another predetermined threshold, which represents a number of transceivers 207 that must be in range before determining that there is an overlap, can be used. That is, whether an overlap is deemed to exist may be based upon a comparison of the predetermined number and the number of transceivers 207 within range of the transmitting transceiver 207. For example, a predetermined threshold of two transistors may be set so that only if the transmitting transceiver 207 is within range of two other transceivers 207 is it determined that there is an overlap.

If it is determined that there is no overlap (No at step 502), then the current instance of the dynamic mesh managing process may end. However, if it is determined that there is an overlap (Yes at step 502), then the process of managing the dynamic mesh proceeds to step 503. In step 503, the status information of the input is analyzed. More specifically, it is determined whether the transmitting transceiver 207 is underutilized in step 503. Determining whether the transmitting transceiver 207 is underutilized may be performed by comparing a number of client devices 208 connected to the transmitting transceiver 207, an amount of bandwidth used by the transmitting transceiver 207, or any other congestion information provided by the transmitting transceiver 207 with an underutilized threshold. If it is determined that the underutilized threshold is not exceeded (Yes at step 503), then the process of managing the dynamic mesh proceeds to step 504. The underutilized threshold may be a predetermined threshold or may be adjusted according to an overall use of the system. The units of measure for the underutilized threshold in different embodiments may vary depending on the information it is compared with. Accordingly, for example, where the underutilized threshold is three (3) client devices 208, if the input indicates that the number of client devices 208 connected to the transmitting transceiver 207 is less than or equal to three (3), then the transmitting transceiver 207 is determined to be underutilized.

In step 504, it is determined whether another transceiver 207, within range of the transmitting transceiver 207, should be used for communicating with the cell towers 102. Because communication with cell towers 102 can be expensive and limited in bandwidth, if another transceiver 207 is within range of the transmitting transceiver 207, it may be desirable to have the other transceiver 207 communicate with the cell towers 102. To determine whether another transceiver 207 should be used, a storage medium storing an indication of the availability of the transceivers 207, within range of the transmitting transceiver 207, may be searched. The search may return results indicating which other transceivers 207 within range of the transmitting transceiver 207 are available to take on an additional load (i.e., have a certain amount of spare bandwidth). Notably, the search may be limited to a search for availability of those transceivers 207 within range of the transmitting transceiver 207 to expedite the search process. Also, a comparison of the congestion information of the transmitting transceiver 207 with the congestion information of the transceivers 207 within range of the transmitting transceiver 207 may be performed. And, based upon the comparison result, it may be determined whether one of the transceivers 207 within range of the transmitting transceiver 207 should be used to communicate with the cell towers 102. Where multiple transceivers 207, within range of the transmitting transceiver 207, are preferred over the transmitting transceiver 207, one of them may be selected in step 504.

If one of the transceivers 207 within range of the transmitting transceiver 207 is to be used (Yes at step 504), then the dynamic mesh managing process proceeds to step 505. In step 505, a connection between the transmitting transceiver 207 and the cell towers 102 is disabled. Further, the transmitting transceiver 207 may be instructed to forward any upstream data (e.g., data that is to be transmitted via the cellular backhaul) to the other transceiver 207 selected in step 504. However, if no other transceiver 207 within range is to be used (No at step 504), then the dynamic mesh managing process proceeds to step 506. In step 506, the current instance of the dynamic mesh managing process may end without changing the connection of the transmitting transceiver 207 to the cellular backhaul.

Returning to step 503, if it is determined that the underutilized threshold is exceeded (No at step 503), then the process of managing the dynamic mesh proceeds to step 507. In step 507, it is determined whether the transmitting transceiver 207 is overutilized. Step 507 may be performed in the same manner as step 503, except that an overutilized threshold is used instead of the underutilized threshold. That is, determining whether the transmitting transceiver 207 is overutilized may be performed by comparing a number of client devices 208 connected to the transmitting transceiver 207, an amount of bandwidth used by the transmitting transceiver 207, or any other congestion information provided by the transmitting transceiver 208 with the overutilized threshold. Like the underutilized threshold, the overutilized threshold may be a predetermined threshold or may be adjusted according to an overall use of the system. If it is determined that the overutilized threshold is not exceeded (No at step 507), then the current instance of the dynamic mesh managing process may end.

However, if it is determined that the overutilized threshold is exceeded (Yes at step 507), then the process of managing the dynamic mesh proceeds to step 508. In step 508, it is determined whether there is an available transceiver 207 within range of the transmitting transceiver 207. In order to improve the quality of service (QoS), if another transceiver 207 is within range of the transmitting transceiver 207, it may be desirable to have the other transceiver 207 assist the overutilized transmitting transceiver 207 in communicating with the cell towers 102 or client devices 208. To determine whether another transceiver 207 is available, a storage medium storing an indication of the availability of the transceivers 207, within range of the transmitting transceiver 207, may be searched. The search may return results indicating which other transceivers 207 within range of the transmitting transceiver 207 are available to take on an additional load (i.e., have a certain amount of spare bandwidth). Notably, the search may be limited to a search for availability of those transceivers 207 within range of the transmitting transceiver 207 to expedite the search process. Also, a comparison of the congestion information of the transmitting transceiver 207 with the congestion information of those transceivers 207 within range of the transmitting transceiver 207 may be performed. And, based upon the comparison result, it may be determined whether one of the transceivers 207 within range of the transmitting transceiver 207 is available to communicate with the cell towers 102 or client devices 208.

If it is determined that other transceivers 207, within the range of the transmitting transceiver 207, are available (Yes at step 508), then the load of the transmitting transceiver 207 may be distributed to the available transceivers 207 in step 509. Further, where multiple transceivers 207, within range of the transmitting transceiver 207, are available, the load may be distributed to each of them. However, if no transceivers 207 are available to assist in distributing the load (No at step 508), for example, because the nearby transceivers 207 are overutilized themselves, then the current instance of the dynamic mesh managing process may end.

Although steps 503 and 507 are shown as separate steps in the example of FIG. 5A, these steps may be combined.

That is one threshold may be utilized for both the underutilized threshold and the overutilized threshold. In such a case, if it is determined that the one threshold is exceeded, the process may proceed directly to step 508, determining that a transceiver is overutilized if it is not underutilized.

Figure 5B:
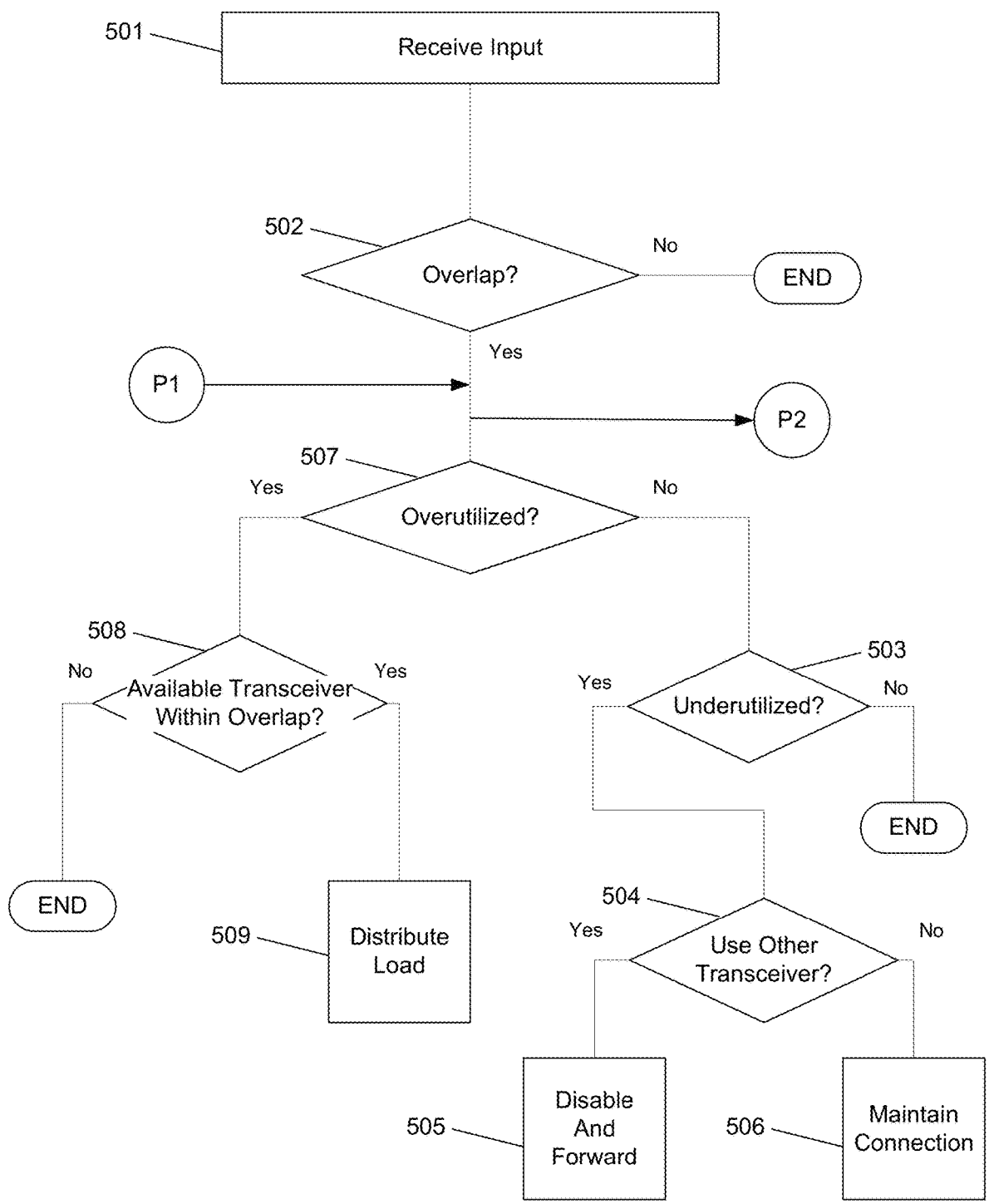

FIG. 5B illustrates another example process for managing a dynamic mesh network. Steps having the same reference numerals as those in FIG. 5A perform similar functions. In FIG. 5B, the order of steps 503 and 507 is switched. In the example of FIG. 5B, the process for managing a dynamic mesh network may determine whether a transceiver 207 is overutilized in step 507, before determining if it is underutilized in step 503.

Figure 6A:
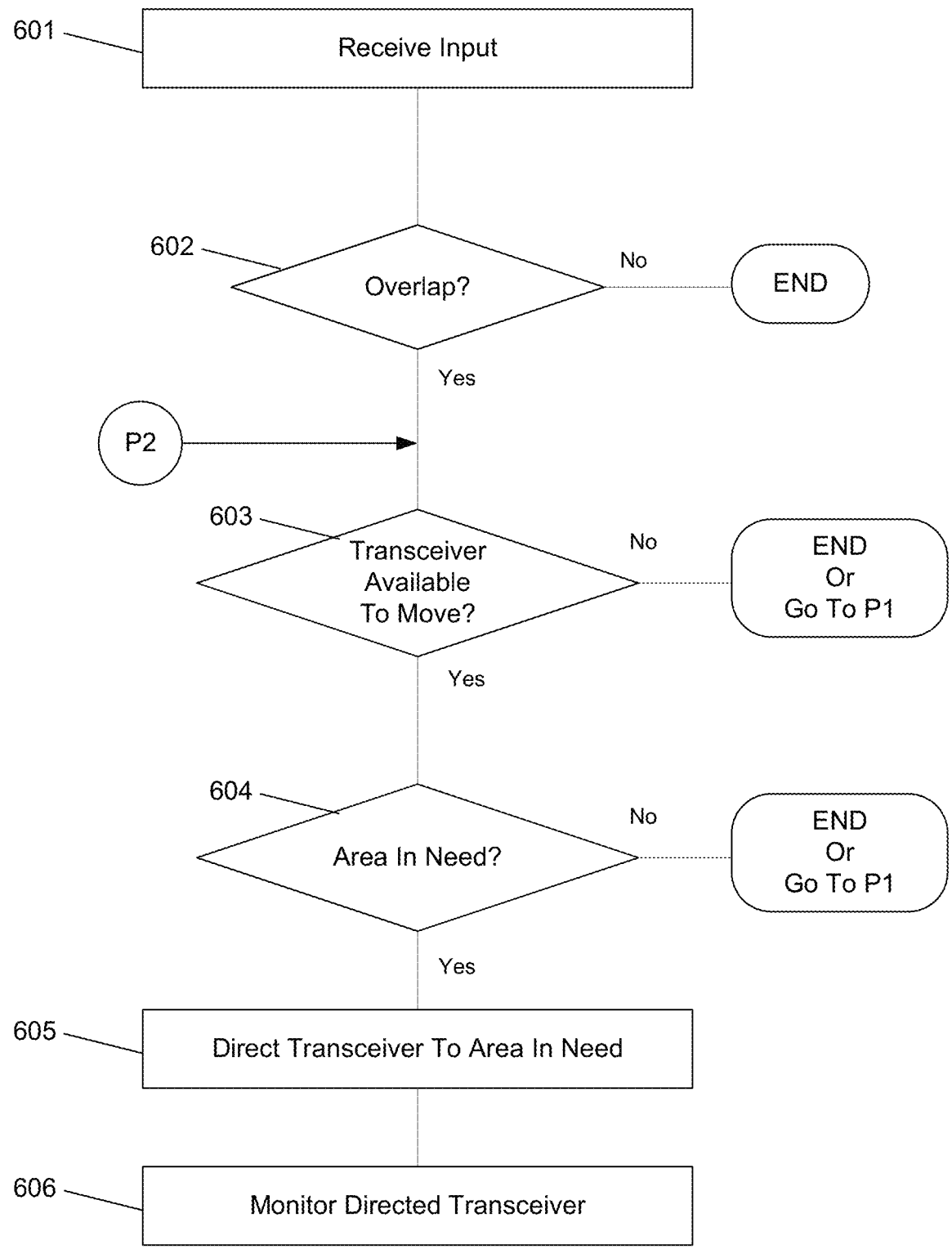
FIGS. 6A and 6B illustrate additional example processes for managing a dynamic mesh.

FIG. 6A illustrates still another example process for managing a dynamic mesh network. While FIG. 6A illustrates just one iteration of the process for managing a dynamic mesh network, it should be understood that many iterations may be performed to continuously manage the network. Here, the example process in FIG. 6A begins with step 601 in which an input is received from a transceiver 207 (below the transceiver 207 that sent the input is referred to as the "transmitting transceiver") via the cellular backhaul. For example, the input received may be an automatically generated update notice for indicating a status of the transceiver 207. The update notice may be received from each of the transceivers 207 at a predetermined interval (e.g., every 5 seconds). The input may include location information and/or status information of the transmitting transceiver 207 from which the input is received. The location information may be any information indicating the location/position of the transmitting transceiver 207. In particular, the location information may be GPS coordinates.

In some embodiments, the transmitting transceiver 207 may be passive, and simply route location and/or status information from another device onto the cellular backhaul. Or, the input received from the transmitting transceiver 207 at step 601 may be an echo reply received in response to an echo request as a result of pinging the transmitting receiver 207.

Step 602 may be performed in a similar manner as step 501, which is described above, and therefore, further description is omitted here. However, in step 602, if overlap is detected (Yes at 602), then the process of managing the network proceeds to step 603.

In step 603, it is determined whether the transmitting transceiver 207 is available to move. When a transceiver 207 is not providing service to any user or client devices 208, it may be desirable to move the transmitting transceiver 207 to another area where it may provide service to client devices 208. If the transceiver 207 is placed in a mobile unit 103 (e.g., a car, truck, person, bicycle, boat, dedicated moving unit, etc.), the transceiver 207 may be moved to another location by moving the mobile unit. In some instances, it may be possible to direct the user of the vehicle to move the mobile unit to a particular location. Accordingly, step 603 may be performed to identify these possibilities. Step 603 may be performed by searching a database to determine whether the transmitting transceiver 207 is available to move. The database may be maintained by the dynamic mesh management platform 209 or may be an external database. The database may store a listing or table of information indicating whether one or more of the transceivers 207 are available to move or not. Such indication information may be obtained from data sent from the transceivers 207 within the mobile units depending on actions of an occupant or operator of the mobile unit (e.g., a car driver may provide an input to the transceiver 207 indicating that it is available to move), or may be obtained from one or more third parties, which monitor the availability of the mobile units.

If the transceiver 207 that sent the input is not available to move (No at step 603), then the current instance of the dynamic mesh managing process may end or may proceed along path P1 to continue with another part of the dynamic mesh managing process, such as that shown in FIG. 5A. However, if the transmitting transceiver 207 is available to move (Yes at step 603), then the process proceeds to step 604. In step 604, it is determined whether there is an area in need of coverage. An area may be in need of coverage if there is no coverage or weak coverage (i.e., low signal strength), or if a relatively high percentage of available bandwidth for a particular area is being utilized. Step 604 may be performed by searching a database to determine where there is a lack of coverage or no coverage provided by the other transceivers 207. The database may store a listing or table of all the transceivers 207 and their locations. Based on the location information in the database, the dynamic mesh managing process may determine which locations are not occupied by transceivers 207 and identify such locations as possible areas in need of coverage. Where multiple areas in need of coverage are identified, step 604 may function to select the area in need that is closest to the transmitting transceiver 207.

If an area in need of coverage is not identified (No at step 604), then the current instance of the dynamic mesh managing process may end or may proceed along path P1 to continue with another part of the dynamic mesh managing process, such as that shown in FIG. 5A. If an area in need is identified (Yes at step 604), then the process proceeds to step 605. In step 605, the transmitting transceiver 207 is directed to the identified area in need of coverage. This step may be performed by providing location information, such as GPS coordinates, to the transceiver 207. The transceiver 207 may then provide the location information through its user I/O 405 to the mobile unit operator or occupant.

Next, step 606 may be performed to monitor a transceiver 207 which has been directed to move to a specific location in step 605. Step 606 may include updating a database to indicate that the directed transceiver 207 is temporary unavailable. This may be done to prevent the transceiver 207 from being redirected while it is in route to the area in need. The location of the transceiver 207 can be monitored so that its availability can be reevaluated once it reaches the destination to which it was directed.

Figure 6B:
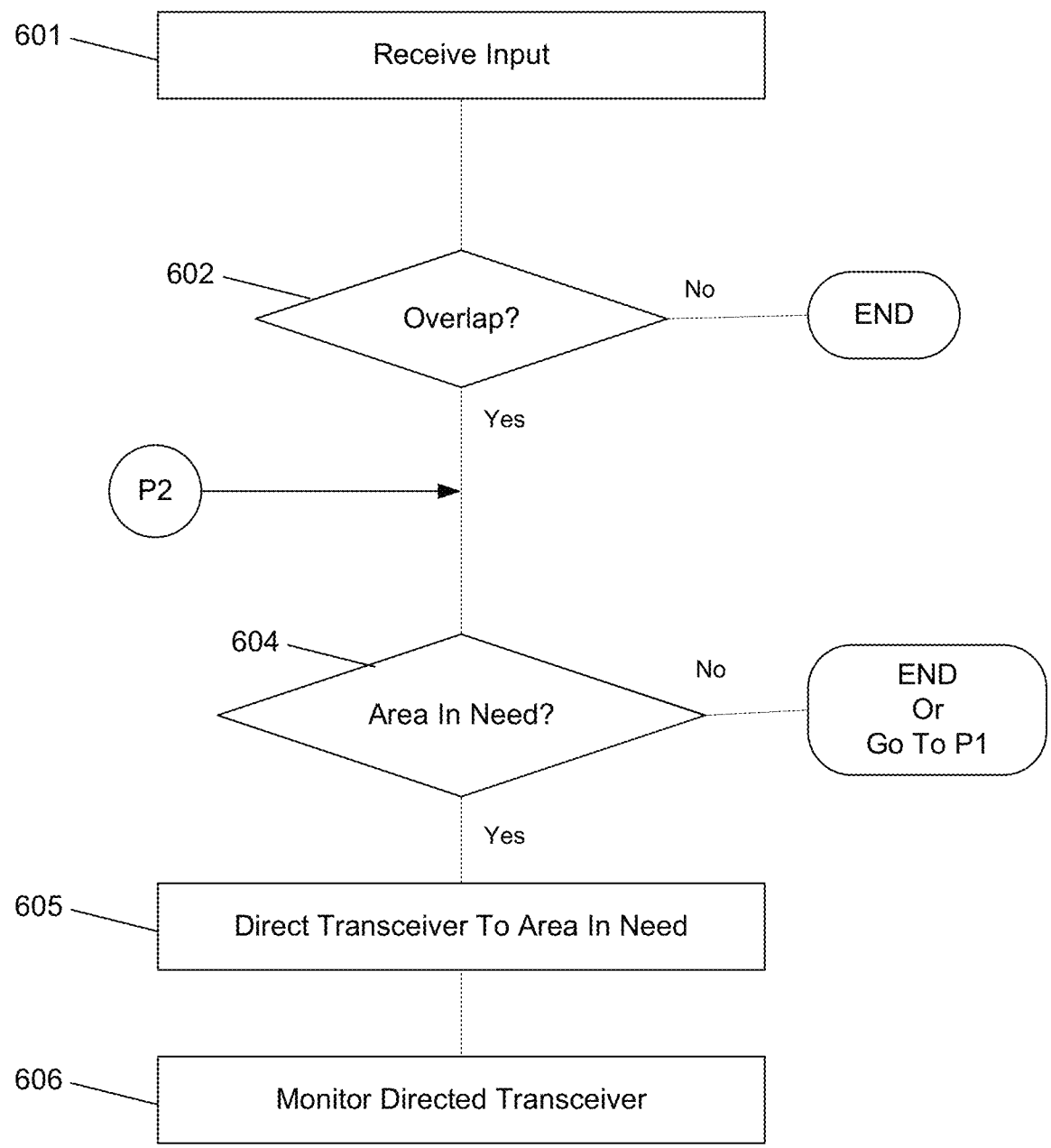

FIG. 6B illustrates another example process for managing a dynamic mesh. Steps having the same reference characters as those in FIG. 6A perform the same function. FIG. 6B is similar to that of FIG. 6A, except that the step 603 is not performed. Rather, it is assumed that the transceiver 207 can be moved, if overlap is detected in step 602.

Although the processes in FIGS. 5A and 5B and FIGS. 6A and 6B have been described separately, it should be noted that these processes may be joined, either in whole or in part. For example, as shown in FIG. 5A, if an overlap is detected in step 502, path P2 may also be followed to step 603 in FIG. 6A or step 604 in FIG. 6B. Likewise, as shown in FIG. 6A, if an available transceiver 207 is not identified at step 603, path P1 may be followed to step 503 in FIG. 5A or step 507 in FIG. 5B. Thus, it is possible for the processes of FIGS. 5A and 5B to be executed at the same time that the processes of FIG. 6A or FIG. 6B are executed.

Figure 7:
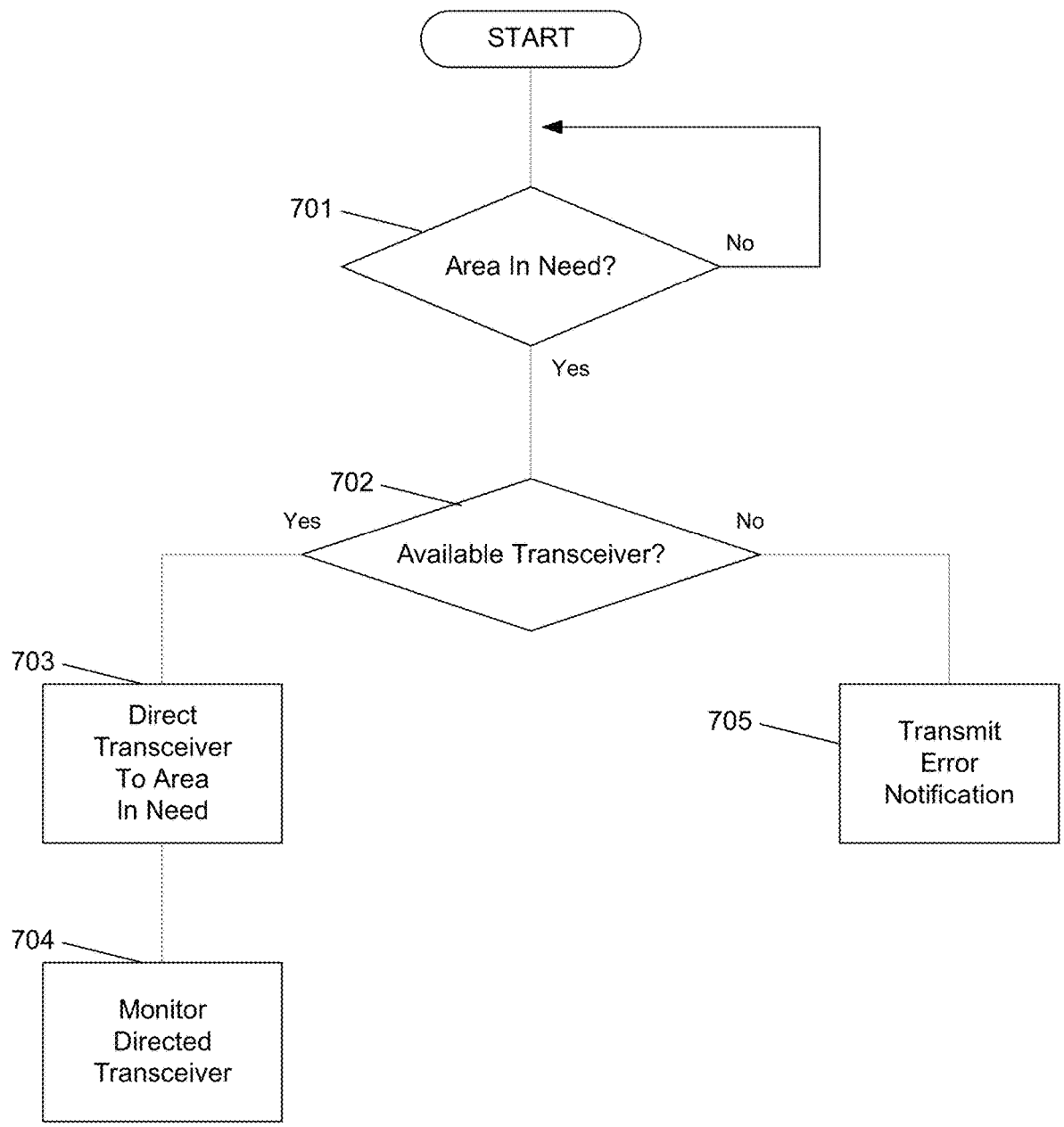
FIG. 7 illustrates yet another example process for managing a dynamic mesh.

FIG. 7 illustrates yet another example process for managing a dynamic mesh network. While FIG. 7 illustrates just one iteration of the process for managing a dynamic mesh, it should be understood that many iterations may be performed to continuously manage the network. The example process in FIG. 7 may be performed to continuously monitor the network of transceivers 207. Accordingly, this process may be performed in addition to and simultaneously with the other processes (in their entirety or portions thereof) of the dynamic mesh management process, including those shown in FIGS. 5A, 5B, 6A, and 6B. Because the process of FIG. 7 may be performed continuously, it does not have to begin with the receipt of an input from a transceiver 207. Rather, as shown, the process of FIG. 7 may begin with step 701 in which it is determined whether there is an area in need of coverage. Step 701 may be performed in a similar manner as step 604. That is, step 701 may be performed by searching a database storing location information for each of the transceivers 207. From the location information of the transceivers 207, locations which are not covered (i.e., areas not within range of a transceiver 207) can be determined. Step 701 may be repeated until an area in need is determined. Also, there may be a predetermined interval of time (e.g., 5 seconds) that elapses before step 701 is repeated. In this manner, the network of transceivers 207 may be continuously reviewed to identify areas in need of coverage.

When an area in need of coverage is identified (Yes at step 701), the process of managing the dynamic network proceeds to step 702. At step 702, it is determined whether there is an available transceiver 207. Further, if more than one available transceiver 207 is identified, then one of the available transceivers 207 may be selected. This selection may be made based on which of the available transceivers 207 is closest to the area in need. Alternatively, the selection may be made based on a priority level of the available transceivers 207. For example, a transceiver 207 that may be more easily moved may be assigned a higher priority level than another available transceiver 207 that may be closer, but harder to move. Further description of step 702 is omitted here because step 702 may be performed in the same manner as step 603, which is described above with regards to FIG. 6A.

Once an available transceiver 207 is selected in step 702 (Yes at step 702), the selected transceiver 207 is directed to the area in need in step 703. Step 703 may be performed in the same manner as step 605 described above, and therefore, further description is omitted here. After step 703 is complete, step 704 may be performed to monitor the directed transceiver 207. Step 704 may be performed in the same manner as step 606 described above, and therefore, further description is omitted here as well.

If no available transceivers 207 are detected at step 702 (No at step 702), then an error notification may be transmitted at step 705. The error notification transmitted in step 705 may direct a stand-by mobile unit equipped with a transceiver 207 to the identified area in need of coverage. The stand-by mobile unit may be a mobile unit that is kept out of service (e.g., previously not included in the mesh of transceivers 207) for the purpose of providing service to areas in need when none of the transceivers 207 currently in the network are available. The stand-by mobile unit may be directed by providing location information, such as GPS coordinates, to the transceiver 207 in the stand-by mobile unit. The transceiver 207 may then provide the location information through its user I/O interface 405 to the stand-by mobile unit operator or occupant. Alternatively, the error notification transmitted at step 705 may be transmitted to a system operator, who may then determine how to solve the lack of coverage dilemma.

FIG. 8 is a high-level diagram of example data, shown in a table 800, that portrays data that may be generated, updated, and/or stored within the dynamic mesh management platform 209. The data table 800 illustrates that a variety of data corresponding to each of the transceivers 207 may be maintained. As shown in the data table 800, each of the 1 to N transceivers 207, where N is any positive integer, may be assigned a unique transceiver ID. The transceiver IDs may be used to identify the transceivers 207. Each transceiver 207 may include its respective transceiver ID in each packet of information that it transmits upstream through the cell towers 102 to the dynamic mesh management platform 209.

The data table 800 may also include location information, such as GPS coordinates or x-y-z coordinates. In some embodiments, the data 800 may include a previous location (e.g., a location 10 minutes ago) so that the dynamic mesh management system 209 may maintain a movement log in order to assist with troubleshooting ineffective transceivers 207. Moreover, the data 800 may include current and previous status information, including information indicating whether transceivers are available, unavailable, temporarily unavailable, overutilized, underutilized, etc. The data 800 is just one abstract example of how the information may be categorized, and other forms of organizing the information are contemplated. It should be understood to one of ordinary skill in the art that several columns in data 800 could be represented with a single piece of data. For example, whether a transceiver 207 is available or not may be represented with a binary digit, so that '1' indicates the transceiver 207 is available and '0' indicates that a transceiver is not available. Furthermore, it should be understood that the data presented in the data table 800 may be divided and stored in various locations.

Figure 9:
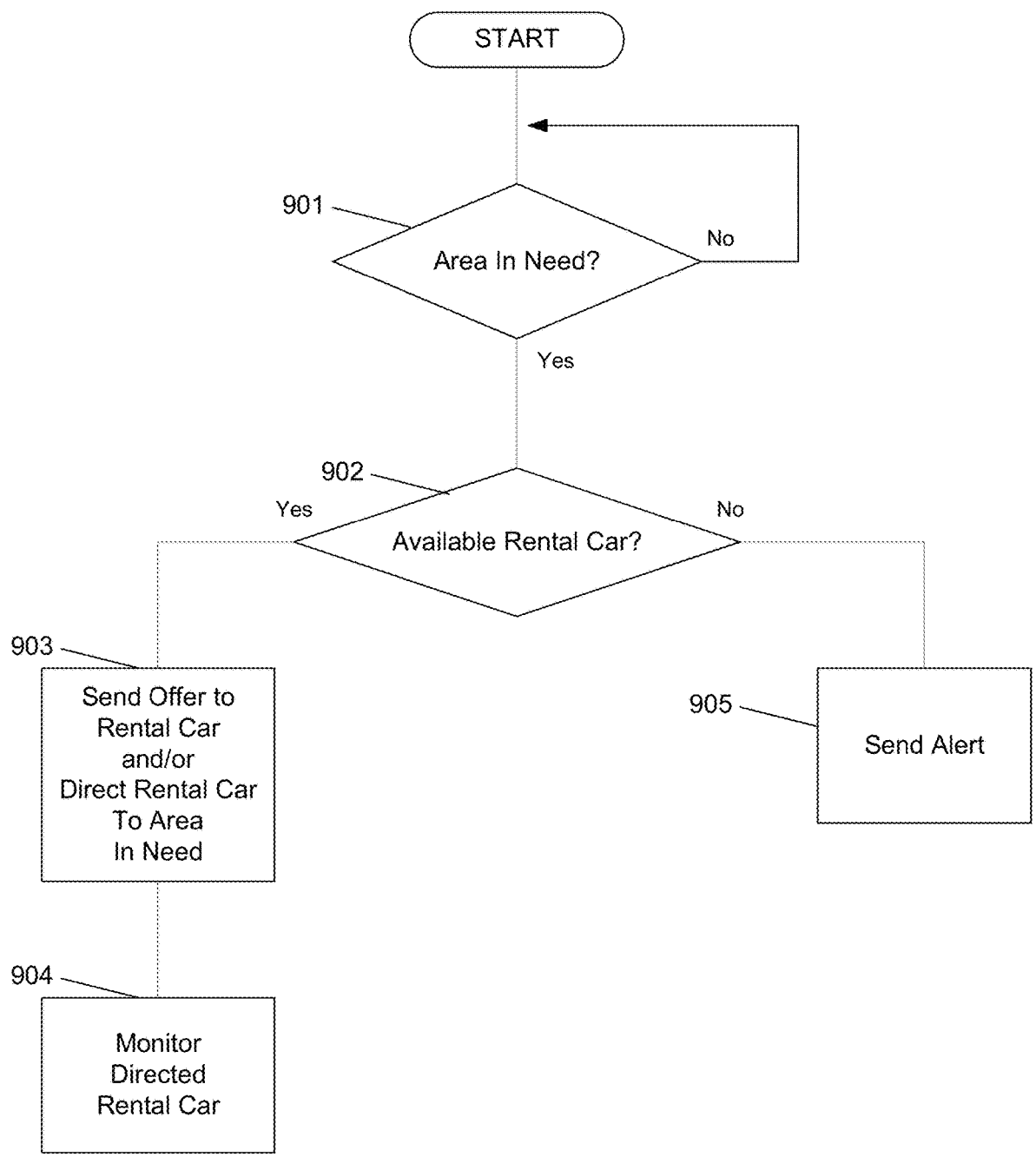
FIG. 9 illustrates an example embodiment in which a process for managing a dynamic mesh is implemented with transceivers placed in mobile units.

FIG. 9 illustrates an example embodiment in which a process for managing a dynamic mesh is implemented with transceivers 207 placed in or on rental cars. Although the process of FIG. 9 uses rental cars as an example, it should be understood that the process could be implemented by placing transceivers 207 in or on any other mobile unit 103, such as bicycles, Segways, buses, police cars, taxis, boats, persons, dedicated vehicles, etc. or any combination of such mobile units. Also, while FIG. 9 illustrates just one instance of the process for managing a dynamic mesh, it should be understood that many instances may be performed to continuously manage the dynamic mesh. In this manner, the network of rental cars may be constantly monitored and controlled.

The example process in FIG. 9 may begin with step 901 in which it is determined whether there is an area in need of coverage. Step 901 may be performed in a similar manner as step 604. That is, step 901 may be performed by searching a database storing location information for each of the rental cars containing transceivers 207. From the location information of the rental cars, locations which are not covered (i.e., areas not within some predetermined range of a rental car) can be determined. Additionally, or alternatively, step 901 may be performed to check whether certain designated areas are covered. For example, in step 901, designated parking spots or parking areas may be checked to determine whether a rental car is there, and if not then that parking spot or parking area may be identified as an area in need of coverage. Step 901 may be repeated until an area in need is determined or until multiple areas in need are determined. Also, there may be a predetermined interval of time (e.g., 5 seconds) that elapses before step 901 is repeated. In this manner, the network of rental cars may be continuously reviewed to identify areas in need of coverage.

When one or more areas in need of coverage are identified (Yes at step 901), the process of managing the dynamic network proceeds to step 902. At step 902, it is determined whether there is an available rental car that has wireless network support and which may be amenable to repositioning. This step may be performed by consulting a database that stores information on rental car schedules. For example, a database may store information on when a rental car is scheduled to be checked out to a driver and/or if it is currently checked out to a driver, where and when the car is scheduled to be returned, and the proximity of that original return point to the area in need. If a rental car is determined to be currently checked out or scheduled to be checked out within a certain predetermined time period (e.g., within the next 15 minutes), then that rental car may be determined to be available. Or, if a rental car is determined to be returned or scheduled to be returned within a certain time period (e.g., within the next 30 minutes) and in a location that is within a predetermined distance (e.g., within 2 blocks, half a mile, etc.) of the area in need, then the rental car may be determined to be available. Further, the availability of a rental car may be set by a driver (or renter) of the rental car. In other words, a driver may set the transceiver 207 in his/her rental car to indicate that the rental car is available and/or willing to move as directed.

If more than one available rental car is identified, then one of the available rental cars may be selected. This selection may be made based on which of the available rental cars is closest to the area in need. Also, where different types of mobile units are used, the selection may be made based on a priority level of the different types. For example, a taxi may be more easily moved than a rental car, and thus, the taxi may be assigned a higher priority level than an available rental car. In some embodiments, the taxi may be assigned a higher priority level even if an available rental car is closer to the area in need of coverage. Further, where the availability of a rental car is set by a driver and more than one available rental car is identified, a rental car may be selected based on which driver is more willing to move their rental car.

Once an available rental car is selected in step 902 (Yes at step 902), the selected rental car is directed to the area in need of coverage in step 903. In step 903, an offer may be transmitted to the transceiver 207 in the selected rental car, and displayed by a computing display in the car. The offer may indicate where the rental car should go (e.g., the area in need of coverage) and what the driver (or renter) will get for taking the rental car to that location. For example, the offer may indicate that if the rental car is dropped off at one or more designated parking spots, the driver will receive a discounted car rental rate, free parking, a coupon for items sold at the designated parking spot, etc. In this manner, the driver may be incentivized to assist in managing the network of transceivers 207 to improve the coverage area. A driver wishing to accept the offer may press a button on the car's computing display, or other computing device (e.g., using a smart phone application) to respond to the offer with an acceptance.

In some embodiments, more than one offer can be made. Offers can vary in incentives and locations. In other words, various incentives can be offered for various locations. Further, in some embodiments, the offer made may be different depending on the location of the rental car, so that rental cars further from the area in need receive greater incentive than rental cars that are closer. Also, a driver via the transceiver 207 in the rental car may communicate an acceptance or rejection of the offer. If the offer is accepted, the dynamic mesh management platform 209 may provide directions to the destination it determines needs additional coverage, so as to assist the driver in reaching the destination. These directions may show up on a GPS within the rental car. Further, if the offer is accepted the dynamic mesh management platform 209 may update a database recording the status of the destination, so that multiple rental cars are not directed to the same location. Meanwhile, if the initial offer is rejected a different offer may be made. The new offer may further incentivize the driver to take the rental car to the destination or may present the driver with another destination.

Next, step 904 may be performed to monitor the status of a rental car that has been directed to a specific location in step 903. Step 904 may include updating a database to indicate that the directed rental car is temporary unavailable for filling other areas in need of coverage. This may be done to prevent rental car from being redirected while it is in route to the area in need first identified. The location of the rental car can be monitored so that its availability can be reevaluated once it reaches the destination to which it was directed. The location of the rental car may also be monitored, so that it can provide a driver (or renter) with the reward for reaching the destination needing coverage. In some embodiments, the dynamic mesh management platform 209 may provide a confirmation number to the driver (or renter) when it detects that the rental car has reached the destination. This confirmation number may then be used to redeem the reward at a subsequent time.

If no available rental cars are detected at step 902 (No at step 902), then an alert may be transmitted at step 905. The alert transmitted in step 905 may be an offer sent to all rental cars or a select list of rental cars. This offer may highly incentivize a driver to take their rental car to the area in need of coverage. The alert may also direct a stand-by mobile unit equipped with a transceiver 207 to the identified area in need of coverage. The stand-by mobile unit may be a mobile unit that is kept out of service (i.e., an unrented rental car) for the purpose of providing service to areas in need when none of the rental cars are available or willing to drive to the area in need. The stand-by mobile unit may be directed by providing location information, such as GPS coordinates, to the transceiver 207 in the stand-by mobile unit. The transceiver 207 may then provide the location information through its user I/O interface 405 to the stand-by mobile unit operator or occupant. Alternatively, the alert transmitted at step 905 may be transmitted to a system operator, who may then determine how to solve the lack of coverage dilemma.

In some embodiments, the alert, in whatever form it may exist as, is not transmitted until an area is in need of coverage for at least a predetermined time period. By waiting for the predetermined period to elapse before sending the alert, the process of managing the dynamic mesh may be controlled so that it does not over-react to temporary service interruptions.

Figure 10:
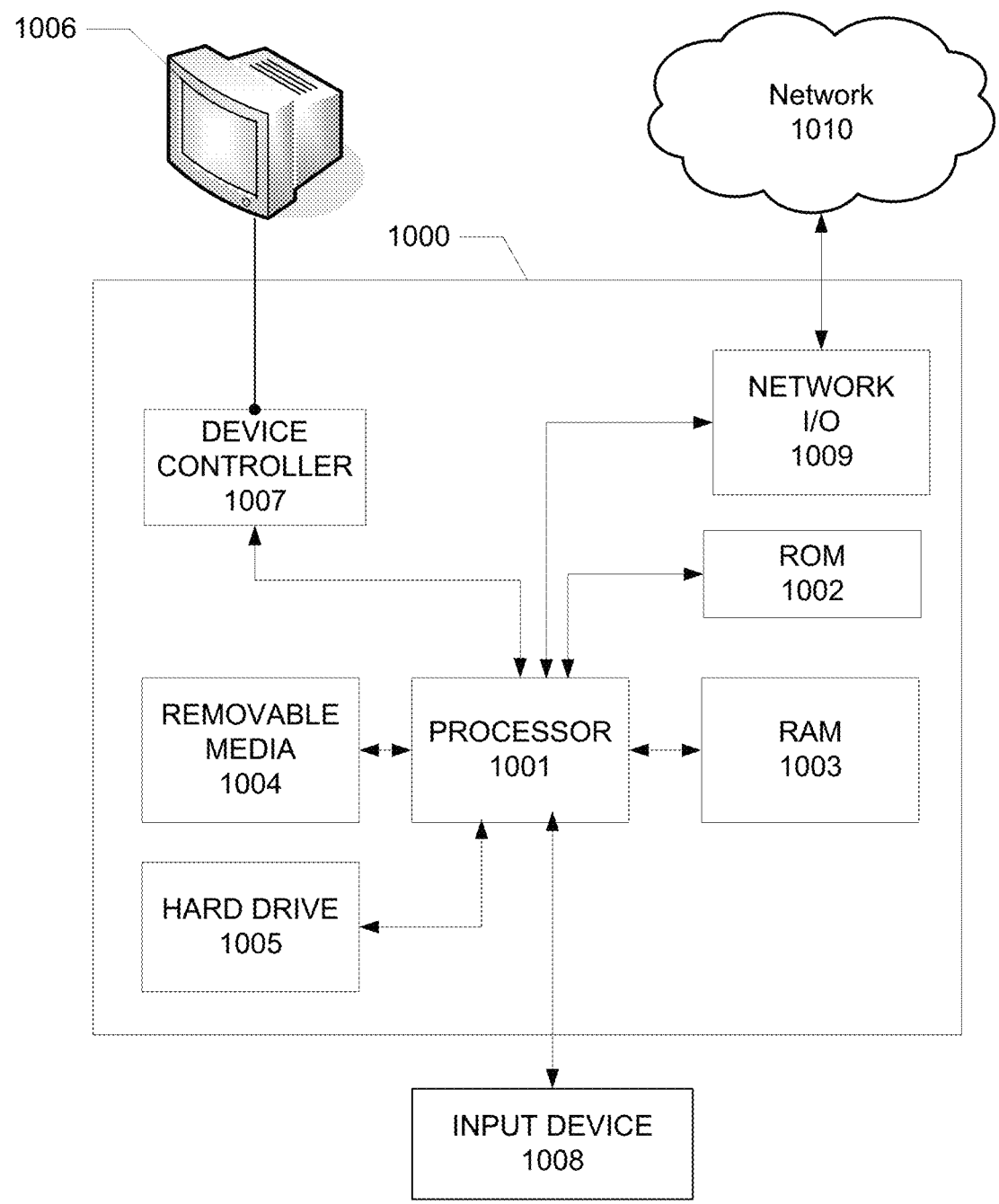
FIG. 10 illustrates an example hardware platform on which some of the various elements described herein can be implemented.

FIG. 10 illustrates general hardware elements that can be used to implement any of the various computing devices discussed herein. The computing device 1000 may include one or more processors 1001, which may execute instructions of a computer program to perform any of the features described herein. The instructions may be stored in any type of computer-readable medium or memory, to configure the operation of the processor 1001. For example, instructions may be stored in a read-only memory (ROM) 1002, random access memory (RAM) 1003, hard drive, removable media 1004, such as a Universal Serial Bus (USB) drive, compact disk (CD) or digital versatile disk (DVD), floppy disk drive, or any other desired electronic storage medium. Instructions may also be stored in an attached (or internal) hard drive 1005. The computing device 1000 may include one or more output devices, such as a display 1006 (or an external television), and may include one or more output device controllers 1007, such as a video processor. There may also be one or more user input devices 1008, such as a remote control, keyboard, mouse, touch screen, microphone, etc. The computing device 1000 may also include one or more network interfaces, such as input/output circuits 1009 (e.g., a network card) to communicate with a network 1010. The network interface 1009 may be a wired interface, wireless interface, or a combination of the two. In some embodiments, the network interface 1009 may include a modem (e.g., a cable modem), and the network 1010 may include the distribution network 201 discussed above, the WAN 205 discussed above, an in-home network, a provider's wireless, coaxial, fiber, or hybrid fiber/coaxial distribution system (e.g., a DOCSIS network), or any other desired network.

The examples described above are merely that—examples. Various modifications can be made as desired as well, such as the addition and/or removal of elements, the combining and/or dividing of elements, and the rearranging of elements. The true scope of this patent should not be limited by these examples, but rather, the scopes of each of the following claims.

The invention claimed is:

1. A method comprising:
  determining, based on a plurality of wireless coverage areas associated with a plurality of access points associated with a service provider, a location to move at least one access point of the plurality of access points for improved wireless coverage for network access via the service provider for at least one user device;
  after the determining the location, determining, based on information indicating an availability of the at least one access point of the plurality of access points, that the at least one access point is available to move; and
  causing the at least one access point to move to the location, wherein at the location a connection between the at least one access point and one or more user devices improves wireless coverage for network access via the service provider for the one or more user devices.

2. The method of claim 1, wherein the location comprises at least one of:
  a location for which there is insufficient wireless network coverage;
  a location in need of wireless network coverage;
  a location for which it is desirable to add wireless network coverage;
  a location that would benefit from receiving wireless network coverage;
  a location outside coverage areas of the plurality of access points;
  a location lacking wireless network coverage;
  a location where a wireless signal has a strength below a threshold strength; or
  a location where bandwidth being used exceeds a threshold bandwidth.

3. The method of claim 1, wherein the causing the at least one access point to move to the location comprises:
  causing the at least one access point to establish a first connection between the at least one access point and the one or more user devices in a wireless coverage area associated with the at least one access point,
  wherein the first connection uses a different protocol than a second connection between the at least one access point and a network.

4. The method of claim 1, wherein the determining the location to move the at least one access point for improved wireless coverage for network access via the service provider for the at least one user device comprises:
  determining, using a database storing a plurality of locations of the plurality of access points, a coverage area associated with the plurality of access points;
  wherein the location is outside the coverage area.

5. The method of claim 1, wherein the determining the location to move the at least one access point for improved wireless coverage for network access via the service provider for the at least one user device comprises:
  determining, based on the plurality of wireless coverage areas associated with the plurality of access points, a plurality of candidate locations; and
  determining, among the plurality of candidate locations, a location closest to one of the plurality of access points.

6. The method of claim 1, wherein the determining, based on the information indicating the availability of the at least one access point of the plurality of access points, that the at least one access point is available to move comprises determining that the at least one access point is not providing network access to any user device.

7. The method of claim 1, wherein the information comprises information from a user of a mobile unit associated with the at least one access point.

8. The method of claim 1, wherein the information comprises schedule information.

9. The method of claim 1, wherein the causing the at least one access point to move comprises sending directions associated with the location.

10. The method of claim 1, further comprising:
  prior to the causing the at least one access point to move to the location, sending a message indicating an incentive to move the at least one access point.

11. The method of claim 1, further comprising:
  after the causing the at least one access point to move to the location, storing information indicating that the at least one access point is unavailable to move.

12. The method of claim 1, wherein the information comprises a schedule associated with a mobile unit carrying the at least one access point.

13. The method of claim 1, further comprising:
  determining, based on a plurality of locations of a plurality of mobile units each carrying one of the plurality of access points, the plurality of wireless coverage areas,
  wherein the determining, based on the information indicating the availability of the at least one access point of the plurality of access points, that the at least one access point is available to move comprises:
    determining that at least one mobile unit, of the plurality of mobile units, that carries the at least one access point is rented by a user and the user has indicated a willingness to move the at least one mobile unit as directed.

14. The method of claim 1, wherein the plurality of access points transmit a service set identifier (SSID) that enables the one or more user devices to connect to the plurality of access points.

15. The method of claim 1, further comprising:
prior to the determining that the at least one access point is available to move, determining, based on movement availability information, that another access point, of the plurality of access points and carried by a mobile unit, is not available to move.

16. The method of claim 1,
wherein the causing the at least one access point to move to the location comprises causing the at least one access point to provide access to a network to a mobile user device that is not connected to the network via any of the plurality of access points, and
wherein the mobile user device comprises at least one of:
a laptop;
a portable computer;
a portable display device;
a tablet;
a notebook;
a personal digital assistant;
a mobile phone; or
a smartphone.

17. The method of claim 1, further comprising:
prior to the causing the at least one access point to move to the location, determining that the at least one access point is underutilized.

18. An apparatus comprising:
one or more processors; and
memory storing instructions that, when executed by the one or more processors, cause the apparatus to:
determine, based on a plurality of wireless coverage areas associated with a plurality of access points associated with a service provider, a location to move at least one access point of the plurality of access points for improved wireless coverage for network access via the service provider for at least one user device;
after determining the location, determine, based on information indicating an availability of the at least one access point of the plurality of access points, that the at least one access point is available to move; and
cause the at least one access point to move to the location, wherein at the location a connection between the at least one access point and one or more user devices improves wireless coverage for network access via the service provider for the one or more user devices.

19. The apparatus of claim 18, wherein the location comprises at least one of:
a location for which there is insufficient wireless network coverage;
a location in need of wireless network coverage;
a location for which it is desirable to add wireless network coverage;
a location that would benefit from receiving wireless network coverage;
a location outside coverage areas of the plurality of access points;
a location lacking wireless network coverage;
a location where a wireless signal has a strength below a threshold strength; or
a location where bandwidth being used exceeds a threshold bandwidth.

20. The apparatus of claim 18, wherein the instructions, when executed, cause the apparatus to:
send a message indicating an incentive to move the at least one access point.

21. The apparatus of claim 18, wherein the instructions, when executed, cause the apparatus to:
based on causing the at least one access point to move, store information indicating that the at least one access point is unavailable to move.

22. The apparatus of claim 18, wherein the instructions, when executed, cause the apparatus to determine the location to move the at least one access point for improved wireless coverage for network access via the service provider for the at least one user device by:
determining a coverage area associated with the plurality of access points; and
determining a location outside the coverage area.

23. The apparatus of claim 18, wherein the instructions, when executed, cause the apparatus to determine the location to move the at least one access point for improved wireless coverage for network access via the service provider for the at least one user device by:
determining, based on the plurality of wireless coverage areas associated with the plurality of access points, a plurality of candidate locations; and
determining, among the plurality of candidate locations, a location closest to one of the plurality of access points.

24. The apparatus of claim 18, wherein the instructions, when executed, cause the apparatus to determine, based on the information indicating the availability of the at least one access point of the plurality of access points, that the at least one access point is available to move by at least one of:
determining that the at least one access point is not providing network access to any user device;
determining, based on information from a user of a mobile unit associated with the at least one access point, that the at least one access point is available to move; or
determining, based on schedule information, that the at least one access point is available to move.

25. A non-transitory computer-readable medium storing instructions that, when executed, cause a computing device to:
determine, based on a plurality of wireless coverage areas associated with a plurality of access points associated with a service provider, a location to move at least one access point of the plurality of access points for improved wireless coverage for network access via the service provider for at least one user device;
after determining the location, determine, based on information indicating an availability of the at least one access point of the plurality of access points, that the at least one access point is available to move; and
cause the at least one access point to move to the location, wherein at the location a connection between the at least one access point and one or more user devices improves wireless coverage for network access via the service provider for the one or more user devices.

26. The non-transitory computer-readable medium of claim 25, wherein the location comprises at least one of:
a location for which there is insufficient wireless network coverage;
a location in need of wireless network coverage;
a location for which it is desirable to add wireless network coverage;
a location that would benefit from receiving wireless network coverage;
a location outside coverage areas of the plurality of access points;
a location lacking wireless network coverage;
a location where a wireless signal has a strength below a threshold strength; or a location where bandwidth being used exceeds a threshold bandwidth.

27. The non-transitory computer-readable medium of claim 25, wherein the instructions, when executed, cause the computing device to:
send a message indicating an incentive to move the at least one access point.

28. The non-transitory computer-readable medium of claim 25, wherein the instructions, when executed, cause the computing device to:
based on causing the at least one access point to move, store information indicating that the at least one access point is unavailable to move.

29. The non-transitory computer-readable medium of claim 25, wherein the instructions, when executed, cause the computing device to determine the location to move the at least one access point for improved wireless coverage for network access via the service provider for the at least one user device by:
determining a coverage area associated with the plurality of access points; and
determining a location outside the coverage area.

30. The non-transitory computer-readable medium of claim 25, wherein the instructions, when executed, cause the computing device to determine the location to move the at least one access point for improved wireless coverage for network access via the service provider for the at least one user device by:
determining, based on the plurality of wireless coverage areas associated with the plurality of access points, a plurality of candidate locations; and
determining, among the plurality of candidate locations, a location closest to one of the plurality of access points.

31. The non-transitory computer-readable medium of claim 25, wherein the instructions, when executed, cause the computing device to determine, based on the information indicating the availability of the at least one access point of the plurality of access points, that the at least one access point is available to move by at least one of:
determining that the at least one access point is not providing network access to any user device;
determining, based on information from a user of a mobile unit associated with the at least one access point, that the at least one access point is available to move; or
determining, based on schedule information, that the at least one access point is available to move.

32. A system comprising:
one or more computing devices configured to:
determine, based on a plurality of wireless coverage areas associated with a plurality of access points associated with a service provider, a location to move at least one access point of the plurality of access points for improved wireless coverage for network access via the service provider for at least one user device;
after determining the location, determine, based on information indicating an availability of the at least one access point of the plurality of access points, that the at least one access point is available to move; and
cause the at least one access point to move to the location, wherein at the location a connection between the at least one access point and one or more user devices improves wireless coverage for network access via the service provider for the one or more user devices; and
an access point transceiver, of the plurality of access points, configured to provide access to a network.

33. The system of claim 32, wherein the location comprises at least one of:
a location for which there is insufficient wireless network coverage;
a location in need of wireless network coverage;
a location for which it is desirable to add wireless network coverage;
a location that would benefit from receiving wireless network coverage;
a location outside coverage areas of the plurality of access points;
a location lacking wireless network coverage;
a location where a wireless signal has a strength below a threshold strength; or
a location where bandwidth being used exceeds a threshold bandwidth.

34. The system of claim 32, wherein the one or more computing devices are configured to determine the location to move the at least one access point for improved wireless coverage for network access via the service provider for the at least one user device by:
determining a coverage area associated with the plurality of access points; and
determining a location outside the coverage area.

35. The system of claim 32, wherein the one or more computing devices are configured to determine the location to move the at least one access point for improved wireless coverage for network access via the service provider for the at least one user device by:
determining, based on the plurality of wireless coverage areas associated with the plurality of access points, a plurality of candidate locations; and
determining, among the plurality of candidate locations, a location closest to one of the plurality of access points.

36. The system of claim 32, wherein the one or more computing devices are configured to determine, based on the information indicating the availability of the at least one access point of the plurality of access points, that the at least one access point is available to move by at least one of:
determining that the at least one access point is not providing network access to any user device;
determining, based on information from a user of a mobile unit associated with the at least one access point, that the at least one access point is available to move; or
determining, based on schedule information, that the at least one access point is available to move.

* * * * *